(12) United States Patent
Sampsell

(10) Patent No.: US 7,948,672 B2
(45) Date of Patent: May 24, 2011

(54) SYSTEM AND METHODS FOR TILING DISPLAY PANELS

(75) Inventor: Jeffrey B. Sampsell, Pueblo West, CO (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 335 days.

(21) Appl. No.: 12/107,669

(22) Filed: Apr. 22, 2008

(65) Prior Publication Data

US 2009/0225396 A1 Sep. 10, 2009

Related U.S. Application Data

(60) Provisional application No. 61/034,777, filed on Mar. 7, 2008.

(51) Int. Cl.
*G02B 26/00* (2006.01)

(52) U.S. Cl. .......................... 359/296; 359/290

(58) Field of Classification Search .................... 359/296
See application file for complete search history.

(56) References Cited

U.S. PATENT DOCUMENTS

| | | | |
|---|---|---|---|
| 5,341,242 A | 8/1994 | Gilboa et al. | |
| 5,517,347 A | 5/1996 | Sampsell | |
| 5,604,607 A | * 2/1997 | Mirzaoff | 358/484 |
| 5,633,739 A | 5/1997 | Matsuyama | |
| 5,671,314 A | 9/1997 | Gregory et al. | |
| 5,754,260 A | 5/1998 | Ooi | |
| 5,835,256 A | 11/1998 | Huibers | |
| 5,999,239 A | 12/1999 | Larson | |
| 6,002,829 A | 12/1999 | Winston | |
| 6,040,937 A | 3/2000 | Miles | |

(Continued)

FOREIGN PATENT DOCUMENTS

CN 1517743 8/2004

(Continued)

OTHER PUBLICATIONS

Abileah A., "Optical Tiled AMLCD for very large display applications," SID International Symposium Digest of Papers, Boston, pp. 945-949, May 17, 1992.

(Continued)

*Primary Examiner* — Ricky L Mack
*Assistant Examiner* — James C Jones
(74) *Attorney, Agent, or Firm* — Knobbe, Martens, Olson & Bear, LLP

(57) ABSTRACT

A plurality of reflective spatial light modulator arrays combined together to form a larger display. Each array can include a plurality of light modulating elements disposed on a substrate. Dead space may exist between active areas and/or at a perimeter of the light modulating elements. A plurality of optical elements each having an input aperture and an output aperture can be used to reduce the effect of the dead space. The input apertures are disposed distally and the output apertures are disposed proximally respectively to the light modulating elements such that light received propagates exits the output apertures to the light modulating elements. The input apertures are larger than the output apertures thereby reducing the amount of dead space between active areas of light modulating elements seen be a viewer. Display drive circuitry can be disposed away from dead space at the perimeter of the arrays and electrically connected to the light modulating elements at locations between the light modulating elements on a substrate. The plurality of arrays can be arranged in a larger array to create a large display. The light modulating elements can include microelectromechanical systems such as interferometric modulators.

46 Claims, 17 Drawing Sheets

U.S. PATENT DOCUMENTS

| | | | |
|---|---|---|---|
| 6,055,090 | A | 4/2000 | Miles |
| 6,538,813 | B1 | 3/2003 | Magno |
| 6,577,429 | B1 | 6/2003 | Kurtz |
| 6,603,520 | B2 | 8/2003 | Umemoto |
| 6,631,998 | B2 | 10/2003 | Egawa et al. |
| 6,652,109 | B2 | 11/2003 | Nakamura |
| 6,674,562 | B1 | 1/2004 | Miles |
| 6,680,792 | B2 | 1/2004 | Miles |
| 6,760,135 | B1 | 7/2004 | Payne |
| 6,883,934 | B2 | 4/2005 | Kawakami |
| 7,012,659 | B2 | 3/2006 | Smith et al. |
| 7,042,643 | B2 | 5/2006 | Miles |
| 7,046,409 | B2 | 5/2006 | Kihara |
| 7,072,093 | B2 | 7/2006 | Piehl |
| 7,110,158 | B2 | 9/2006 | Miles |
| 7,123,216 | B1 | 10/2006 | Miles |
| 7,342,709 | B2 | 3/2008 | Lin |
| 7,360,899 | B2 | 4/2008 | McGuire |
| 7,377,678 | B2 | 5/2008 | Huang |
| 7,456,805 | B2 | 11/2008 | Ouderkirk |
| 7,508,571 | B2 | 3/2009 | Gally |
| 7,807,488 | B2 | 10/2010 | Gally |
| 2003/0107692 | A1 | 6/2003 | Sekiguchi |
| 2003/0193630 | A1 | 10/2003 | Chiou |
| 2004/0115339 | A1 | 6/2004 | Ito |
| 2005/0101059 | A1 | 5/2005 | Yang |
| 2006/0012733 | A1 | 1/2006 | Jin |
| 2006/0066935 | A1 | 3/2006 | Cummings |
| 2006/0067600 | A1 | 3/2006 | Gally |
| 2006/0077124 | A1 | 4/2006 | Gally |
| 2006/0198013 | A1 | 9/2006 | Sampsell |
| 2006/0250676 | A1 | 11/2006 | Hagood, IV |
| 2006/0274400 | A1 | 12/2006 | Miles |
| 2009/0086301 | A1 | 4/2009 | Gally |
| 2009/0196068 | A1 | 8/2009 | Wang |
| 2010/0033988 | A1 | 2/2010 | Chiu |
| 2010/0214642 | A1 | 8/2010 | Miles |

FOREIGN PATENT DOCUMENTS

| | | |
|---|---|---|
| DE | 34 02 746 | 8/1985 |
| EP | 0 855 745 | 7/1998 |
| EP | 1 014 161 | 6/2000 |
| EP | 1 093 105 | 4/2001 |
| EP | 1640337 | 3/2006 |
| JP | 62-009317 | 1/1987 |
| JP | 05 281479 | 10/1993 |
| JP | 07-509327 | 10/1995 |
| JP | 09-507920 | 8/1997 |
| JP | 11 002712 | 1/1999 |
| JP | 11 211999 | 8/1999 |
| JP | 2001 305312 | 10/2001 |
| JP | 2002-297044 | 10/2002 |
| JP | 2004-012918 | 1/2004 |
| JP | 2004-062099 | 2/2004 |
| JP | 2004-111278 | 4/2004 |
| JP | 2004-510185 | 4/2004 |
| JP | 2004-206049 | 7/2004 |
| KR | 2002 010322 | 2/2002 |
| WO | WO 95/01584 | 1/1995 |
| WO | WO 95/14256 | 5/1995 |
| WO | WO 99/67680 | 12/1999 |
| WO | WO 2004/006003 | 1/2004 |
| WO | WO 2004/036270 | 4/2004 |
| WO | WO 2006/036451 | 4/2006 |
| WO | WO 2009/114394 | 9/2009 |

OTHER PUBLICATIONS

International Search Report and Written Opinion in PCT/US2009/036237 (Publication No. WO 2009/114394) dated Jun. 26, 2009.

International Search Report and Written Opinion in PCT/US2005/031238; International Publication No. WO 2006/036451) dated Dec. 14, 2005.

International Preliminary Report on Patentability in PCT/US2005/031238, (WO 2006/036451), dated Apr. 5, 2007.

International Preliminary Report on Patentability in PCT/US2009/036237 (Publication No. WO 2009/114394) dated Sep. 16, 2010.

Office Action in U.S. Appl. No. 11/156,335, dated May 3, 2007.

Amendment in U.S. Appl. No. 11/156,335, dated Aug. 2, 2007.

Requirement for Restriction/Election in U.S. Appl. No. 11/156,335, dated Oct. 11, 2007.

Response to Requirement for Restriction/Election in U.S. Appl. No. 11/156,335, dated Oct. Nov. 6, 2007.

Office Action in U.S. Appl. No. 11/156,335, dated Jan. 29, 2008.

Amendment in U.S. Appl. No. 11/156,335, dated Apr. 28, 2008.

Official Communication in Japanese Application No. 2007-533498, dated Jul. 13, 2010.

\* cited by examiner

|  | +$V_{bias}$ | -$V_{bias}$ |
|---|---|---|
| 0 | Stable | Stable |
| +Δ$V$ | Relax | Actuate |
| −Δ$V$ | Actuate | Relax |

Column Output Signals (top), Row Output Signals (left)

SYSTEM AND METHODS FOR TILING DISPLAY PANELS

CROSS-REFERENCE TO RELATED APPLICATIONS

This application claims the benefit of U.S. provisional application 61/034,777 filed Mar. 7, 2008 entitled "SYSTEM AND METHOD FOR TILING DISPLAY PANELS" and which is incorporated herein in its entirety by reference.

BACKGROUND

1. Field of the Invention

The invention relates to the field of visual displays and to systems and methods of assembling smaller display elements to create larger composite displays.

2. Description of the Related Art

Visual displays have been produced in a wide variety of configurations and sizes and are utilized in a wide variety of applications for presentation of visual images. Displays can be utilized to portray still and/or moving visual images as black and white or color, depending on the particular implementation of visual display. Displays can be adapted to display informational images, entertainment images, and/or a combination of both.

Displays can employ such technologies as cathode ray tubes (CRTs), liquid crystal displays (LCDs), light emitting diodes (LEDs), plasma displays, and others. In general, smaller size displays such as might be used for personal consumer electronic equipment typically employ a single display panel and range in size from the order of a few centimeters as might be used with a wrist watch or small cellular telephone handset to one to two meters, such as may be provided with a large screen television display.

There is frequently a need, however, for significantly larger displays, for example, at sporting arenas, concert or theater venues, race tracks, etc. Such large displays can be used to provide, for example, scoring, stats, time, or other information related to the sporting event and/or enlarged up-close images of the performers or event to improve the experience for the attendees. Such displays may also be used for advertising. One type of large display is known under the registered trademark of Sony Corporation as a "Jumbotron." The Jumbotron is formed as an array of display elements with each display element being composed of three or six smaller CRTs, each forming one color of a composite pixel. Jumbotron-type displays have been developed and installed ranging in size from approximately 9 meters diagonally to 47 meters diagonally. Similar large displays are also offered by companies such as Daktronics and Barco N.V. and employ a large number of individual LEDs. Such types of displays have had commercial success and are widely employed in a variety of indoor and outdoor venues, generally to provide display information to multiple viewers and are visible from extended viewing distances. While capable of providing a large display using a large number of CRTs or LEDs, such an approach is costly to implement and frequently does not offer high resolution images. CRT based designs also have significant power consumption and excessive heat concerns.

A second general approach to providing large displays is to tile a plurality of smaller full video capable displays to generate a larger display. For example, a plurality of smaller complete displays can be arranged in an array with each display showing a portion of a larger image. A difficulty faced with this approach is that the original image needs to be decimated and separate full video rate portions of the image need to be created and sent to the different displays, generally in a proprietary format. This increases the cost and complexity of such approaches.

A difficulty exists in providing what might be considered intermediate size displays, for example, on the order of approximately 4 meters diagonal screen size. With current technology, such an intermediate size display is too large to be feasible to be made with a single full video capable display, such as a single CRT, LCD, or plasma-type display. The generally acceptable price point of such intermediate size displays also typically precludes the "Jumbotron" approach as such an implementation would not be economical. For example, the power consumption per display area of a CRT based Jumbotron type display is generally prohibitive for smaller intermediate installations.

Projection type displays are capable of providing such intermediate size images at reasonable cost. However in many implementations, a projection type implementation is disfavored due to the difficulties in providing and maintaining an unobstructed projection path between an image projector and an image projection screen. A further concern is that an intermediate size display occupies a relatively large area. Self-illuminating or emissive-type display implementations can exhibit excessive power consumption and energy usage cost concerns, particularly in applications where the display would be desirably utilized for extended periods of time.

SUMMARY

One embodiment includes a display apparatus defining an active viewing area visible to a viewer, said apparatus comprising a plurality of reflective spatial light modulator arrays, each of said reflective spatial light modulating arrays comprising a plurality of light modulating elements disposed on a substrate, said plurality of reflective spatial light modulator arrays arranged in a larger array and a plurality of optical elements each having an input aperture and an output aperture, said input aperture being larger than said output aperture, said input aperture disposed distal to said light modulating elements and said output aperture disposed proximal to said light modulating elements such that light received by said input apertures propagates though said optical elements and exits said output apertures to said light modulating elements.

Another embodiment includes a display apparatus defining an active viewing area visible to a viewer, said display comprising a plurality of reflective spatial light modulator arrays, each of said reflective spatial light modulator arrays comprising a plurality of light modulating elements disposed on a substrate, each of said reflective spatial light modulator arrays having a perimeter comprising inactive area, said plurality of reflective spatial light modulator arrays arranged in a larger array and display drive circuitry disposed away from said perimeter of said reflective spatial light modulator arrays and electrically connected to said light modulating elements at locations between said light modulating elements.

DETAILED DESCRIPTION OF PREFERRED EMBODIMENTS

Figure 1:
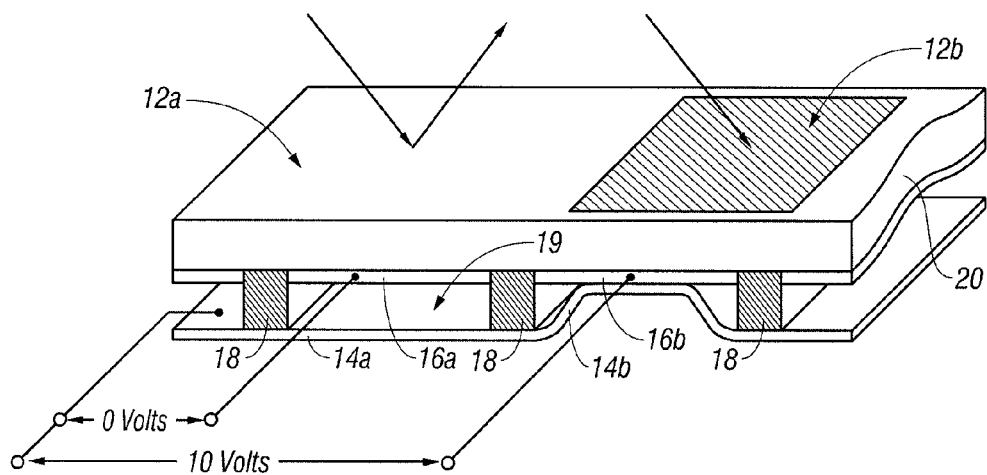
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Various embodiments described herein comprise a plurality of reflective spatial light modulator arrays combined together to form a larger display. Each of the reflective spatial light modulator arrays includes a plurality of light modulating elements disposed on a substrate. The light modulating elements may be arranged in groups, each group forming a pixel for the larger display. In various embodiments, dead space may exist between the pixels. Each of the reflective spatial light modulator arrays also has a perimeter comprising inactive area or dead space. A plurality of optical elements each having an input aperture and an output aperture can be used to reduce the affect of the dead space. The input apertures are disposed distal to the light modulating elements and the output apertures are disposed proximal to the light modulating elements such that light received by the input apertures propagates though the optical elements and exits the output apertures to the light modulating elements. The input apertures are larger than the output apertures thereby reducing the amount of dead space between active areas of light modulating elements seen be a viewer. In some embodiments, display drive circuitry can be disposed away from dead space at the perimeter of the spatial light modulator arrays and electrically connected to the light modulating elements at locations between the light modulating elements on a substrate. The plurality of reflective spatial light modulator arrays can be arranged in a larger array to create a large display. The light modulating elements can include microelectromechanical systems such as interferometric modulators.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one example process and system for using an array of interferometric modulators in a display application.

Figure 2:
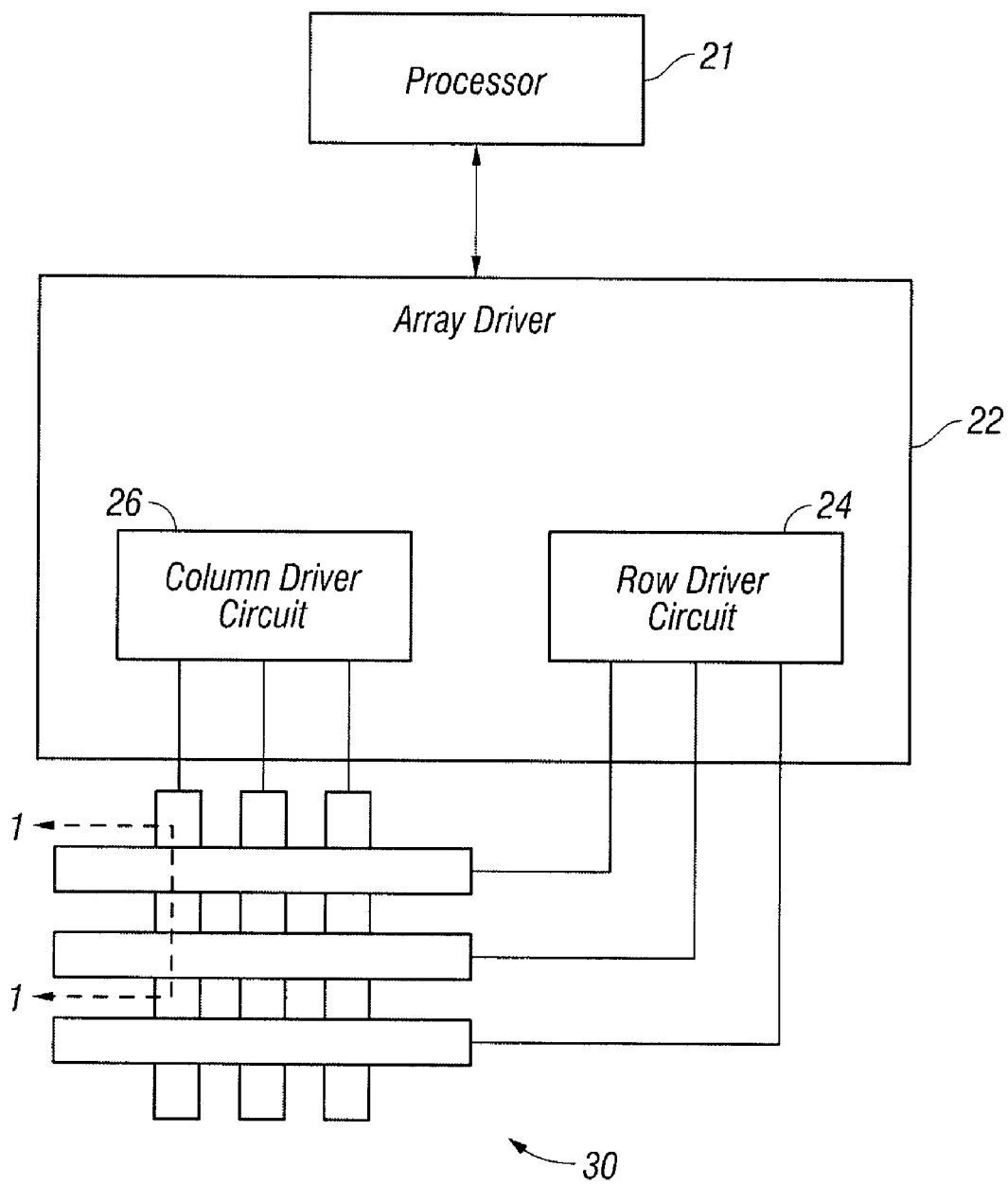
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the example embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the example embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
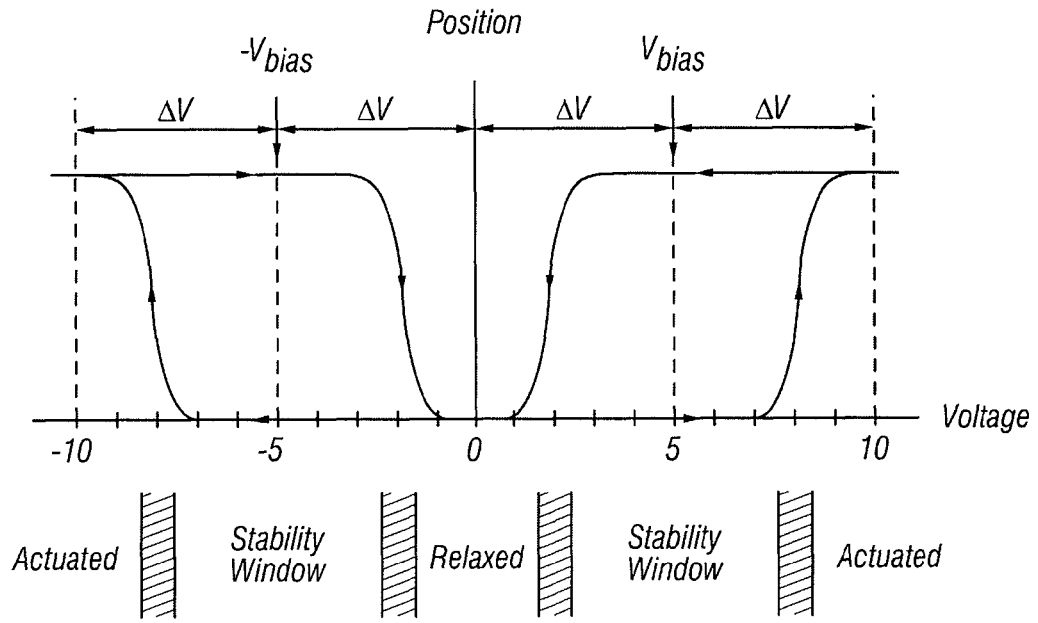
FIG. 3 is a diagram of movable mirror position versus applied voltage for one example embodiment of an interferometric modulator of FIG. 1.
FIG. 4 is an illustration of a set of row and column voltages that may be used to drive an interferometric modulator display.
Figure 5A:
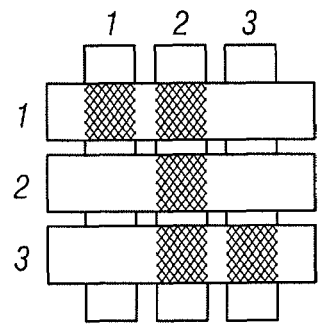
FIG. 5A illustrates one example frame of display data in the 3×3 interferometric modulator display of FIG. 2.
Figure 5B:
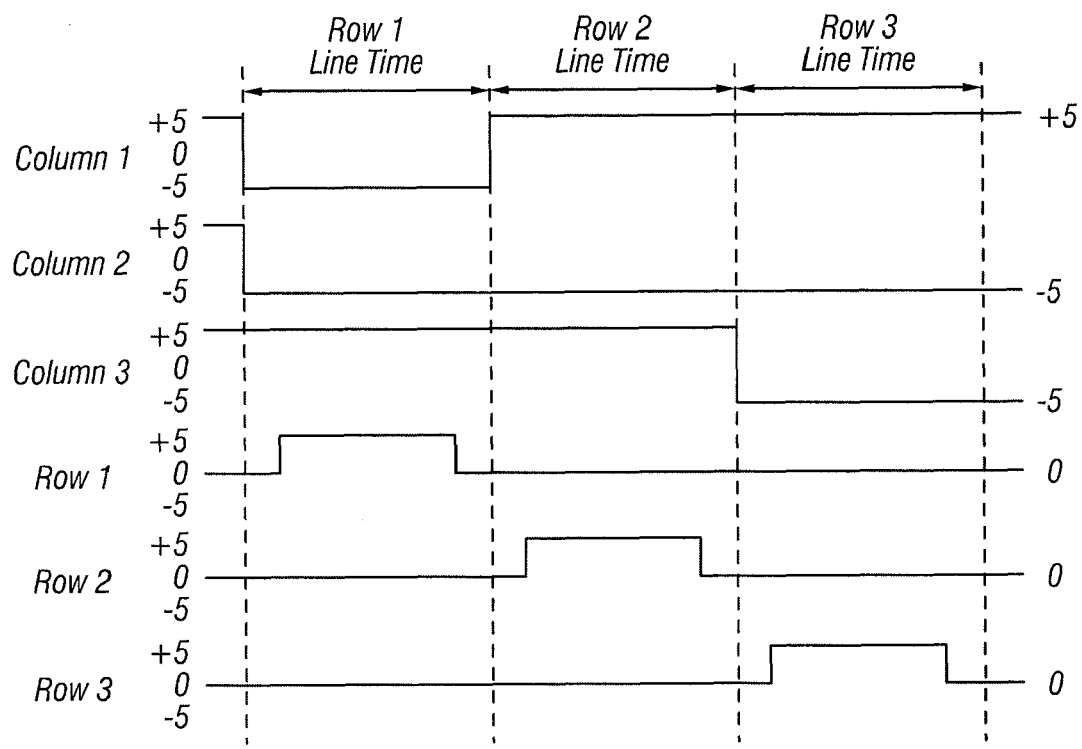
FIG. 5B illustrates one example timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is example only, and any actuation voltage method can be used with the systems and methods described herein.

Figure 6A:
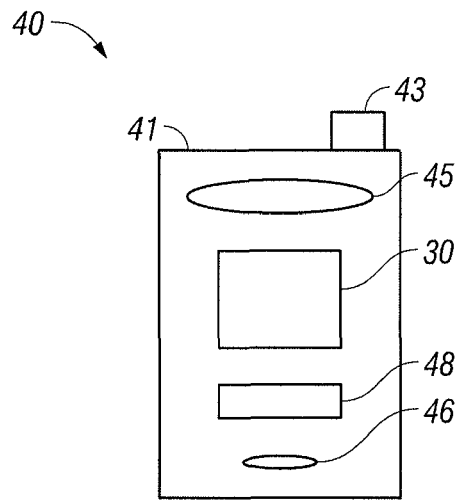
FIGS. 6A and 6B are system block diagrams illustrating an embodiment of a visual display device comprising a plurality of interferometric modulators.
Figure 6B:
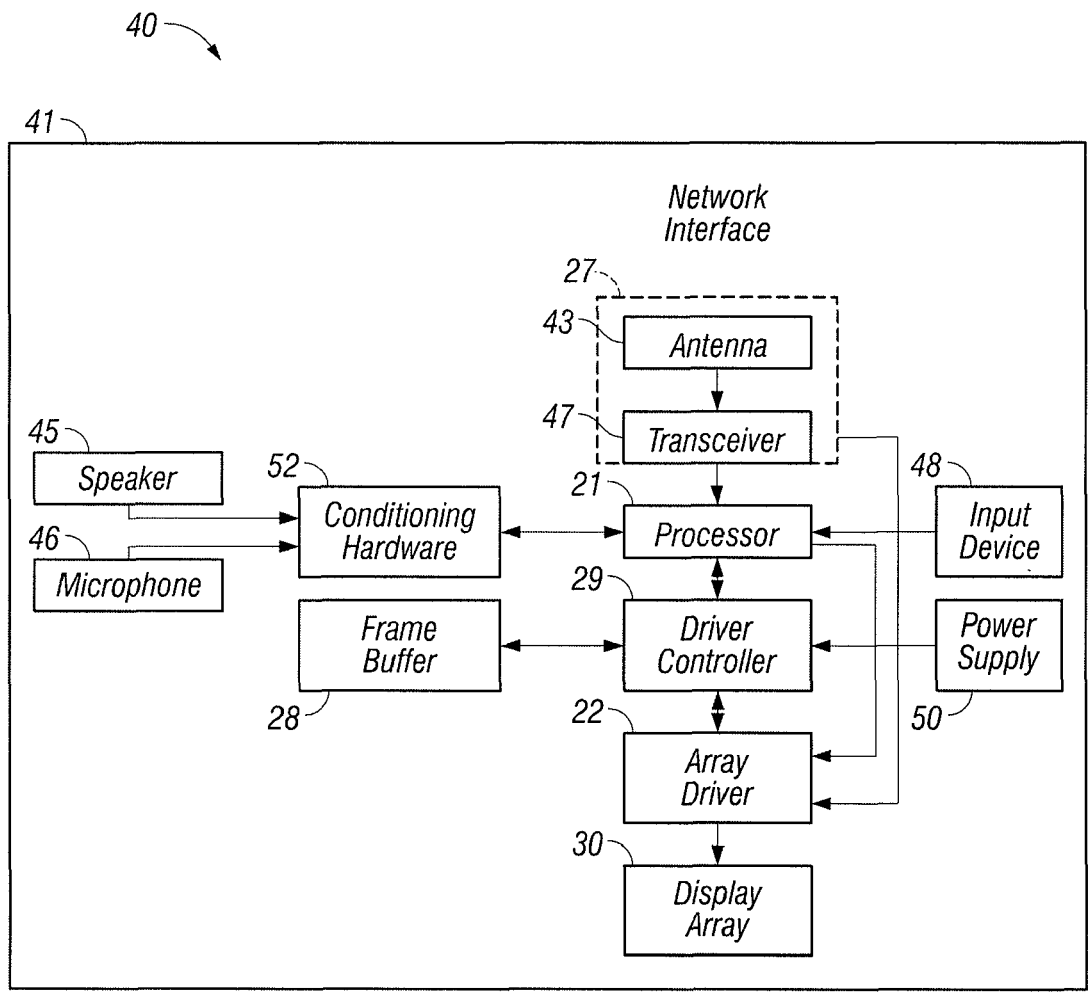

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of example display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of example display device 40 are schematically illustrated in FIG. 6B. The illustrated example display device 40 includes a housing 41 and can include additional components at least partially enclosed therein. For example, in one embodiment, the example display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular example display device 40 design.

The network interface 27 includes the antenna 43 and the transceiver 47 so that the example display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the example display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the example display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the example display device 40. Conditioning hardware 52 generally includes amplifiers and filters for transmitting signals to the speaker 45, and for receiving signals from the microphone 46. Conditioning hardware 52 may be discrete components within the example display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the example display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the example display device 40. When the microphone 46 is used to input data to the device, voice commands may be provided by a user for controlling operations of the example display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
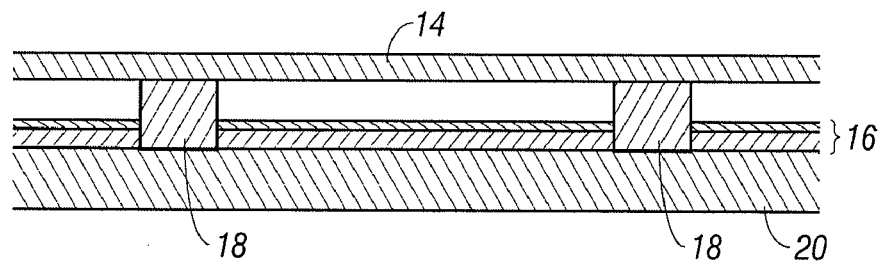
FIG. 7A is a cross section of the device of FIG. 1.
Figure 7B:
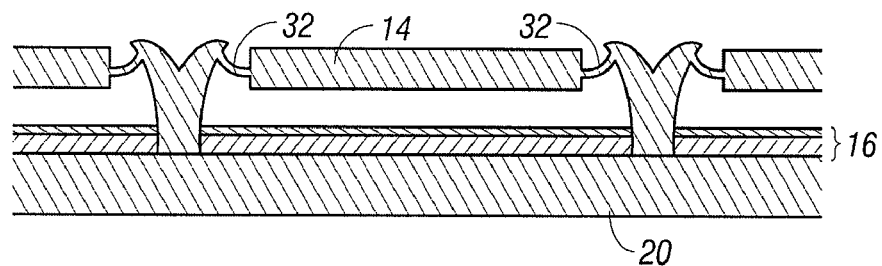
FIG. 7B is a cross section of an alternative embodiment of an interferometric modulator.
Figure 7C:
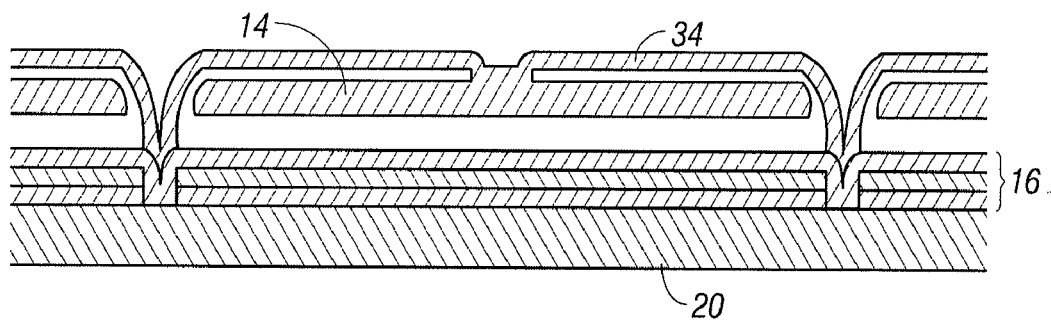
FIG. 7C is a cross section of another alternative embodiment of an interferometric modulator.
Figure 7D:
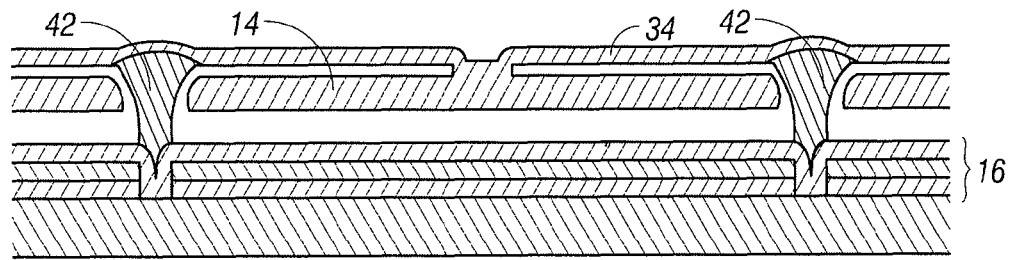
FIG. 7D is a cross section of yet another alternative embodiment of an interferometric modulator.
Figure 7E:
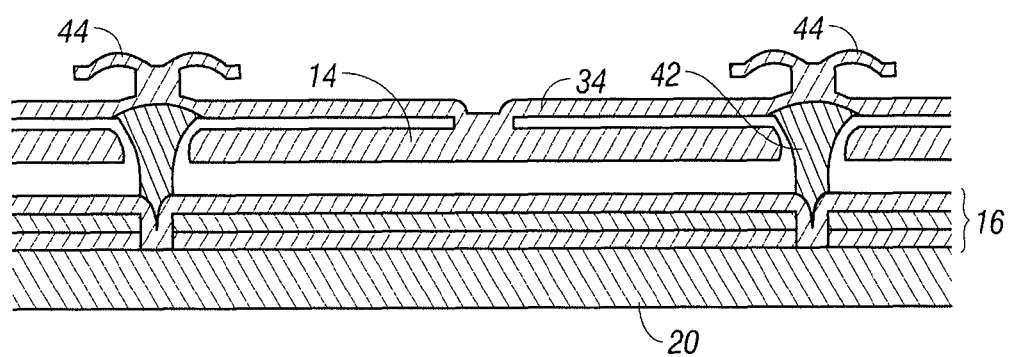
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Arrays (referred to herein as bricks) of display panels, including, but not limited to embodiments of interferometric modulators such as described above, can be coupled or tiled together to form larger displays. The display panels may comprise, for example, a plurality of interferometric modulators on a substrate of the size that could be used for displays in cellphones, PDAs, etc. As discussed below, in certain embodiments, the display panels may advantageously be formed using the same production equipment as used to fabricate displays for cell phones, PDAs, etc. The photomask used, however, may be different to provide for a design customized for use in larger displays. For example, such a photomask may introduce spaces devoid of modulators, which are referred to herein as dead spaces. These dead spaces may be used in some embodiments for electronics or electrical connections. (In other embodiments, display panels designed for cell phones, PDAs, etc., are tiled together to form larger displays. A certain portion of the light modulation elements are not driven and are thus effectively dead space as described more fully below.)

In either case, when the display panels are coupled together, larger displays are possible that may be used for different applications. Certain embodiments described herein therefore include a display that can be utilized in a wide variety of locations where existing single full video capable displays are too small and where the economics do not allow use of the larger Jumbotron or arrayed LED approach. Certain embodiments provide an intermediate-sized display that can be relatively inexpensively produced and marketed and has relatively low power consumption characteristics. Certain embodiments provide an intermediate-sized display that avoids the clear projection path limitations (e.g., large distance between projector and screen) of projection-type displays and offers the installation convenience and flexibility of low profile or "flat panel" type displays. Certain embodiments employ non-imaging optical elements to improve image quality and facilitate alternative architectures. Some embodiments can employ existing designs of full video displays and other embodiments can employ full video displays customized for tiling into larger display assemblies.

Figure 8:
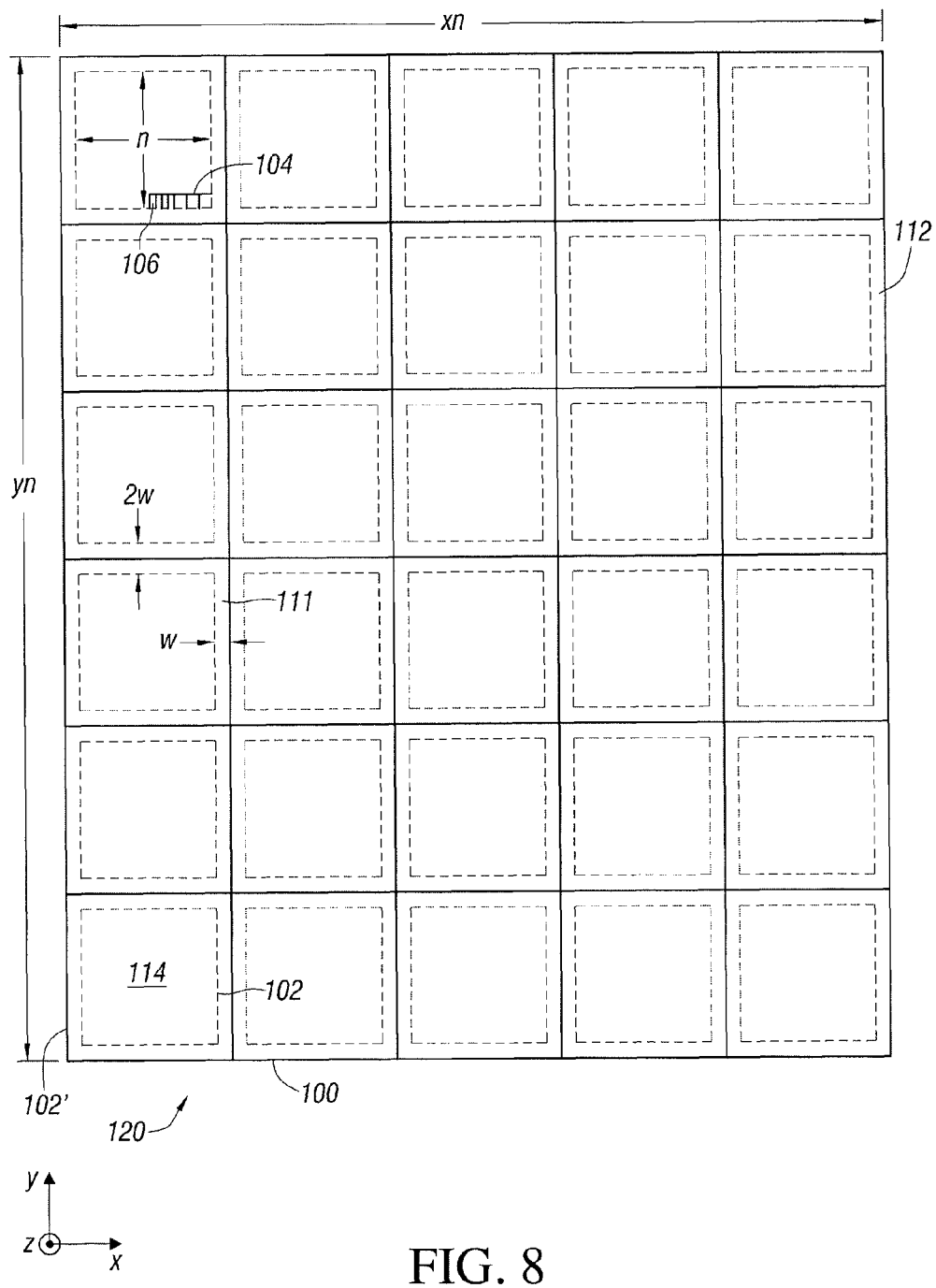
FIG. 8 illustrates one embodiment of a single display panel comprising a plurality of pixels disposed on a single substrate; each of the pixels comprises many subpixels.
Figure 11:
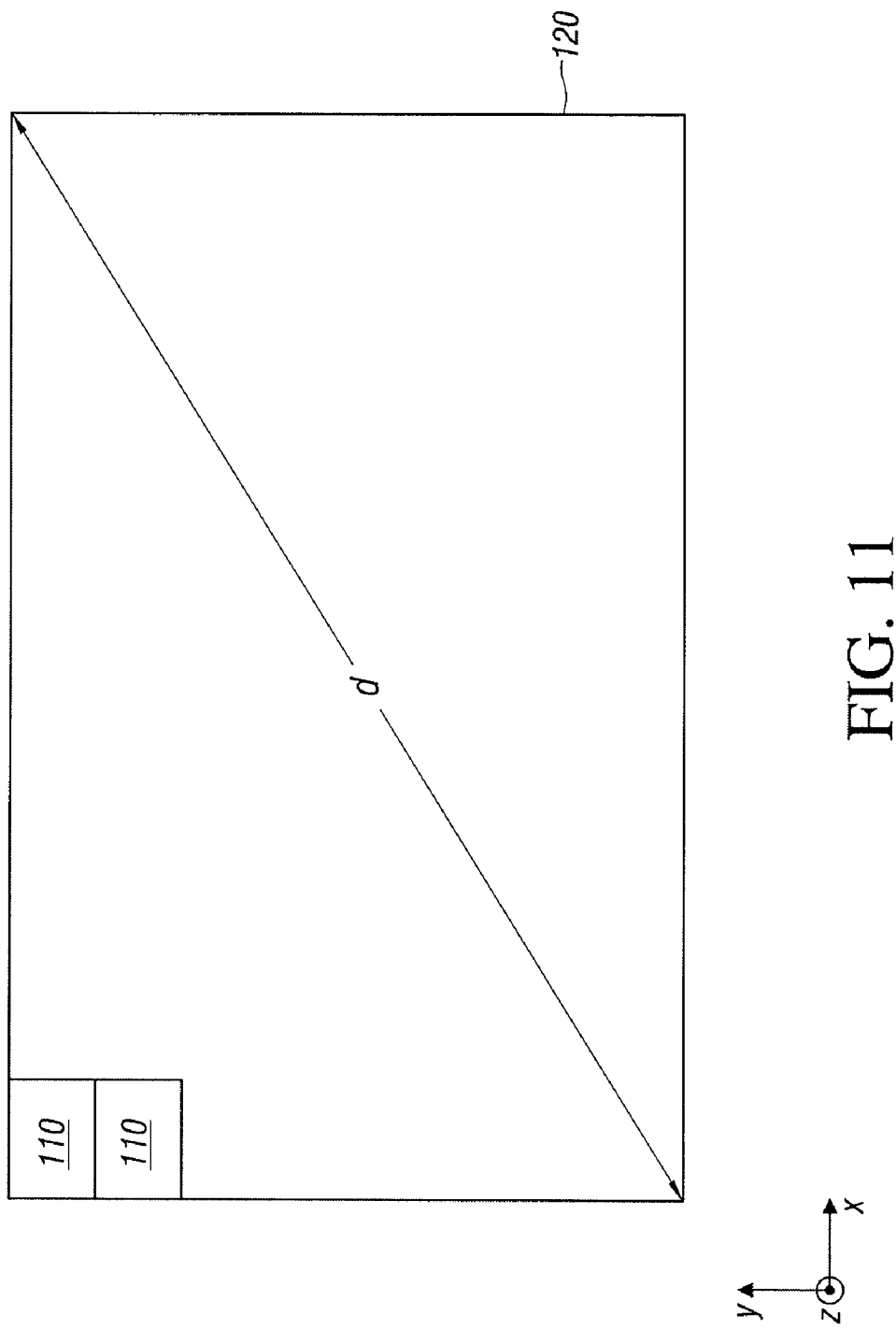
FIG. 11 illustrates one embodiment of a display comprising a plurality of bricks.

FIG. 8 illustrates one embodiment of a representative display panel 100 which can be combined with a plurality of other display panels 100 to define a larger display assembly 120 (see FIG. 11 for large display 120, itself comprising a plurality of modules or bricks). The reference number 120 shown in FIG. 8 is to indicate that the display panel 100 is part of the large display 120 shown in FIG. 1. In various embodiments, each display panel 100 is a full video capable display itself adapted to portray alphanumeric characters and full color still and moving video images. In some embodiments, the display panels 100 can be fabricated using production lines optimized for the fabrication of displays for portable personal electronic devices such as PDAs, cellular telephony handsets, digital music players, and the like. The specific designs (e.g., photomask) may be altered to accommodate tiling the display panels together to form larger displays as discussed fully below.

In certain embodiments, the same display panels as employed for such portable devices can be used; however, in such embodiments portions of the display panels may be consistently undriven or unused in such configurations. The display panel 100 can comprise one or more of multiple display technologies including, but not limited to, cathode ray tubes, light emitting diode displays, plasma displays and/or liquid crystal displays. In certain embodiments, the display panels comprise microelectro-mechanical systems (MEMS) display elements. In certain preferred embodiments, the display panels 100 comprise interferometric modulation (IMOD) type displays. Display panels 100 configured as IMODs have the advantage of good color depth, relatively low power consumption, and image hysteresis wherein a displayed image will endure for an extended period of time when provided with an intermediate activation potential, for example until rewritten with new image data.

In some embodiments, the display panels 100 are approximately one to five inches in width. In one embodiment, the display panels 100 are provided in dimensions of approximately 1.1"×1.4" or approximately 1.8" on the diagonal of a generally rectangular-shaped display panel 100. These display panels 100 comprise display elements (e.g., modulators) disposed on a substrate of comparable or slightly larger size. Such displays may be mass produced on fabrication lines used for other applications such as cell phones, PDAs, etc. In various embodiments, however, the display panels 100 are custom designed for use in tiling applications, such as to form a display assembly 120. (As discussed below, in some embodiments the same display panels 100 as employed for applications such as cell phones, PDAs, etc., can be used, however, portions of the display panels are consistently undriven, unused, or not to be viewed by the intended viewer.)

In certain embodiments, each display panel 100 is configured to display a plurality of pixels 102 each comprising a plurality of smaller sub-pixels 104. The plurality of sub-pixels 104 can comprise a group or set of a plurality of color elements 106. For example, in one embodiment red, green, and blue color elements 106 can be activated in various combinations to provide different display colors for an associated sub-pixel 104. (These sets may be considered to comprise pixels in a display panel 100 used in a product such as a cell phone, PDA, or other similar device.)

In one embodiment, a display panel 100 is configured to display an x×y array of pixels 102. In one embodiment, each pixel 102 comprises an array of n×n sub-pixels 104, each sub-pixel comprising one or more, such as three, color elements 106, such as a red, a green, and a blue color element 106. In certain preferred embodiments, the pixels 102 of a display panel 100 and display 120 (see e.g., FIG. 11 showing large display 120 comprising a plurality of modules or bricks) comprise a consistent, uniform number and arrangement of sub-pixels 104 within the display panel 100. For example, in certain embodiments, a pixel 102 can comprise a single sub-pixel 104, 2×2 sub-pixels 104, 3×3 sub-pixels 104, 4×4 sub-pixels 104, 5×5 sub-pixels 104, and the like. In such examples, the pixel 102 comprises rows and columns of sub-pixels 104 that form an array, the number of rows being equal to the number of columns and the size of the sub-pixels 104 being the same. Other configurations, however, are possible. For example, the number of rows can differ from the number of columns (for example, 2×4 and 1×3 arrangements of sub-pixels). Additionally, the sub-pixels 104 need not be arranged in a regularly shaped rectangular array. Similarly, the sub-pixels 104 may have different sizes. In one embodiment, sub-pixels 104 of increasing size are used in a pixel 102 to provide area modulation. Similarly, elements 106 within the sub-pixels 104 may have increasing size to provide area modulation. Still other arrangements are possible.

Thus, in one embodiment, the display panel 100, having X×Y pixels, is capable of displaying nx×ny total sub-pixels 104 (e.g., each pixel comprising n×n sub-pixels), wherein each sub-pixel 104 comprises one or more display elements such as an interferometric modulator. It will be understood that both the display panel 100 and partitioning thereof into pixels 102 comprising groups of sub-pixels 104 can be configured in a generally square shape, a generally rectangular shape, or other configurations depending on the requirements of a specific application. In various embodiments, the pixels 102 and groups of sub-pixels 104 can themselves be of a generally square shape, a generally rectangular shape, or other configurations or sizes, depending on the needs of particular applications. Other configurations, however, are possible.

In one embodiment such as shown in FIG. 8, nonimage areas 111 are between pixels 102. The nonimage areas 111 comprise regions which either do not have display capability or where display capability is not necessarily used. For example, nonimage areas 111 can correspond to regions devoid of display elements or alternatively to image capable regions of the display that are not addressed or used for display purposes. As described above, for example, the display panels can be fabricated using the same production equipment (e.g., fab lines) as used for making displays used for portable devices such as cell phones and PDAs. Using established technology (equipment and process) to fabricate the display panels reduces cost, improves yield, and overall makes the components easier to produce. In such embodiments, the design (e.g., photomask) used for display panels to be tiled together to form larger displays can be different.

For example, display elements can be excluded from the non-image areas 111. In some embodiments, such non-image areas 111 may be used instead for driver or control electronics or other components. (In other embodiments where the same display panels as used for portable devices such as cell phones, PDAs, etc., are tiled together to form a larger display, the non-image areas 111 may comprise display elements that are consistently not driven, are unused or otherwise do not contribute to the image on the display 120 as observed by the intended viewer.) In one embodiment, the nonimage areas 111 extend substantially uniformly around the periphery of a pixel 102 and have a width W. Thus, in one embodiment, the nonimage areas 111 have a separation between active/image areas of pixels 102 of approximately 2 W. In certain embodiments, the width 2 W corresponds to the spacing between adjacent active areas of adjacent pixels and in certain embodiments between adjacent display elements or modulators. In FIG. 8, the distance 2 W between pixels 102 is exaggerated for illustrative purpose. In some embodiments, the spacing 2 W between pixels 102 may be between 1 to 6 millimeters.

In certain embodiments, the display panels 100 have ledges 112 arranged generally at the perimeter of the display panel 100. The ledges 112 can comprise regions of the display panels 100 that may lack display capability and can be dedicated to other functions, such as providing driver circuitry for the display panels 100. In some embodiments, the ledge 112 also has a dimension or width, W. Accordingly, in certain embodiments, a width of the ledge 112 can be approximately 0.5 to 3 millimeters.

As will be understood, the presence of the nonimage areas 111 or ledges 112 within a larger display 120 (see, e.g., FIG. 11 for large display comprising plurality of modules or bricks) comprising a plurality of the display panels 100 could otherwise impair perceived image quality depending on the display 120 size and viewing distance of a given implementation. For example, the image might otherwise appear pixilated or grainy because of dead space visible to the viewer or exhibit a "window screen" appearance. Accordingly, in certain embodiments, the display 120 comprises additional components and structure to accommodate the presence of non-image areas 111 and/or ledges 112 within an overall viewing area while maintaining a high quality perceived image to the viewer. In certain embodiments, the display panels 100 and display 120 define effective pixels 102' that provide a substantially continuous effective viewing image to a viewer such that the viewer is substantially not able to perceive any nonimage areas 111 during normal viewing of the display 120. These aspects of embodiments will be described in greater detail below.

Figure 9:
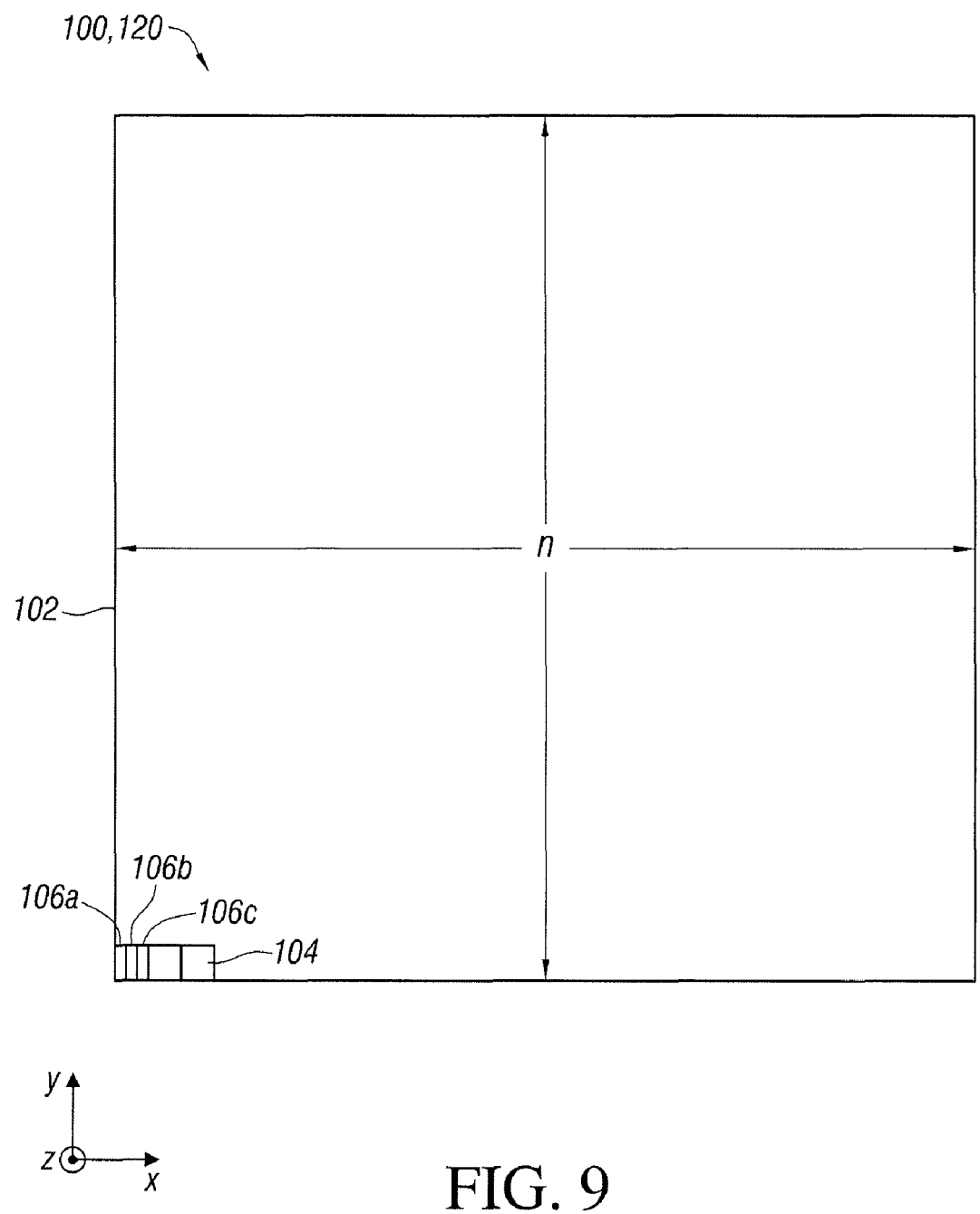
FIG. 9 illustrates one embodiment of a single pixel comprising a plurality of sub-pixels.

FIG. 9 illustrates a single pixel 102 of a display panel 100 of a display 120. The reference numerals 100, 120 are shown in FIG. 9 to indicate that the pixel 102 is part of the display panel 100 (shown in FIG. 8) which is part of the larger display 120 (shown in FIG. 11). In this embodiment, the pixel 102 comprises a generally square n×n array of a plurality of sub-pixels 104. In this embodiment, the sub-pixels 104 each comprise a red color element 106a, a green color element 106b and a blue color element 106c. Activation of the plurality of red, green, and blue color elements 106a, 106b, and 106c in various combinations can be employed to provide multiple color images in manners well understood by one of skill.

For example, a pixel 102 can be selectively activated to provide the desired color (e.g. hue) and/or intensity for a pixel in a variety of colors and/or in a monochromatic image. The numerous color elements 106 provide high color depth and dynamic range. In various embodiments, the red color elements 106a, green color elements 106b and blue color elements 106c can each be of a generally square shape, a generally rectangular shape, or other configurations and of various sizes, depending on the needs of particular applications. It should be noted that other primary sets of elements 106 can be used as well. Red, green, blue, and yellow can be used in a four-primary combination. Red, green, blue, yellow, and cyan can be used in a five-primary combination. White pixels can be added to any multi-primary set to enhance brightness and highlight performance.

In one nonlimiting embodiment, for a 25×25 group of sub-pixels, each pixel 102 comprises 625 sub-pixels 104. In an embodiment wherein each sub-pixels 104 comprises a red color element 106a, a green color element 106b, and a blue color element 106c, each pixel 102 has approximately 27 bits of color depth (9 bits of red, 9 bits of green, and 9 bits of blue). The 27 bits of color depth provided by this example embodiment provides a desired level of color depth or richness for anticipated applications of various embodiments of the display 120. Other compositions, numbers, and/or arrangements of color element 106, sub-pixels 104 and pixels 102 are possible. The multi-primary arrangements discussed above are just one example.

In certain embodiments, the larger display 120 built by arranging many display panels 100 accommodates viewing distances between a viewer and the display 120 that can be significantly greater than a reasonable viewing distance for a smaller display the size of the display panel 100. Thus, in at least certain implementations, the display 120 employs a plurality of display panels 100 configured to display a total image significantly larger than an image portrayed by a single display panel 100.

Figure 10:
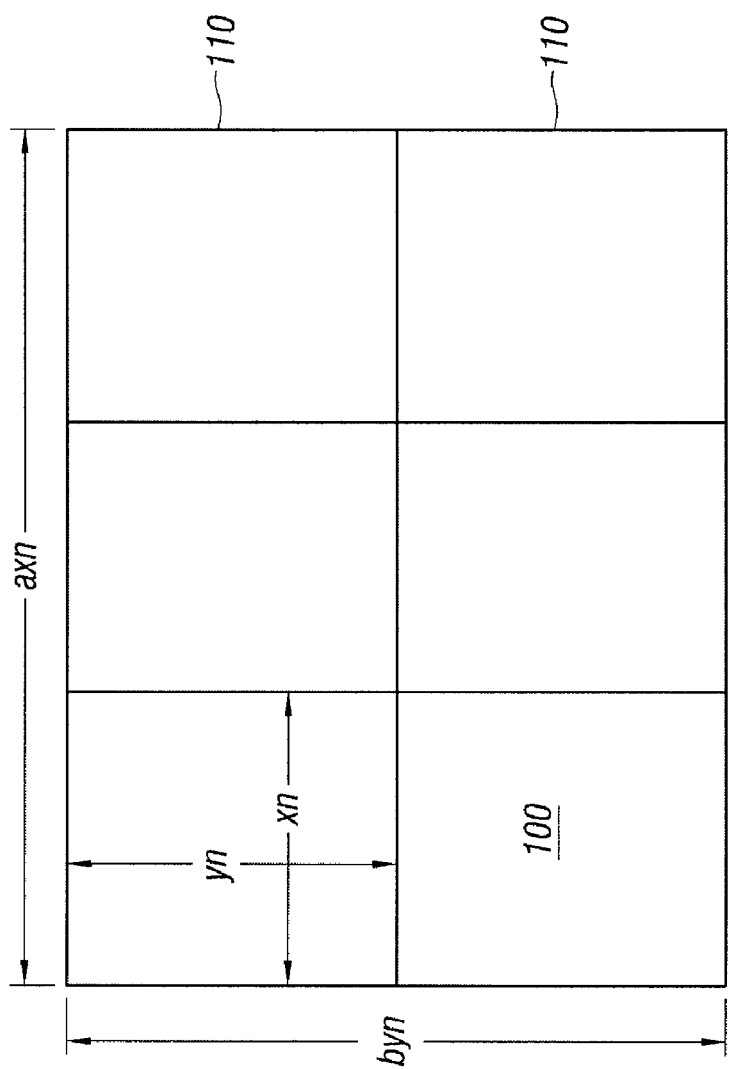
FIG. 10 illustrates one embodiment of a module referred to herein as a brick or tile comprising a plurality of single display panels.

FIG. 10 illustrates schematically one embodiment of a higher level of integration of individual display panels 100. In this embodiment, a plurality of display panels 100 is arranged in an array to define a larger module referred to herein as a brick or tile 110. The brick 110 generally corresponds to an array of the display panels 100, where the display panels 100 correspond to an array of display elements. In certain embodiments, the bricks 110 have a width of approximately four to twelve inches. In one embodiment, six individual display panels 100 are arrayed in a 2×3 rectangular array to define a brick 110.

In some embodiments, display panels 100 are tiled directly to rearward surfaces of optical elements. In some embodiments, display panels are attached to one or more transparent planar members, such as a sheet(s) of glass where the planar members are interposed between the display panels 100 and the optical elements. Display panels 100 can also be attached to a supporting substrate arranged behind the display panels 100. For example, in some embodiments, back plates of the display panels 100 can be attached to a circuit board. In yet other embodiments, the display panels 100 can be connected or secured together with a frame structure. A frame structure can attach to or secure the display panels 100 generally about an outer edge of the display panels 100, such as generally in the ledge 112 regions. Alternatively, the frame structure can attach adhesively to the back side of the display panels away from their edges. Optical elements can be arranged to extend or protrude downward through the frame structure to engage with the display panels 100.

FIG. 11 illustrates schematically a higher level of integration comprising a display 120 comprising a plurality of bricks 110, each brick 110 comprising a plurality of display panels 100 as previously described. In one example embodiment, an array of approximately 40×40 bricks 110, each brick 110 comprising a 2×3 array of display panels 100 each display panel having dimensions of approximately 1.1"×1.4" or approximately 1.8" on the diagonal results in a display 120 having a diagonal dimension D of approximately 3.7 meters. In certain embodiments, the display 120 is constructed with a diagonal dimension of approximately two to ten meters. It will be understood that the number and arrangement of components and their dimensions in this example embodiment is simply one of many possible arrangements and dimensions of components. Other dimensions and/or configurations are possible and contemplated.

Figure 12:
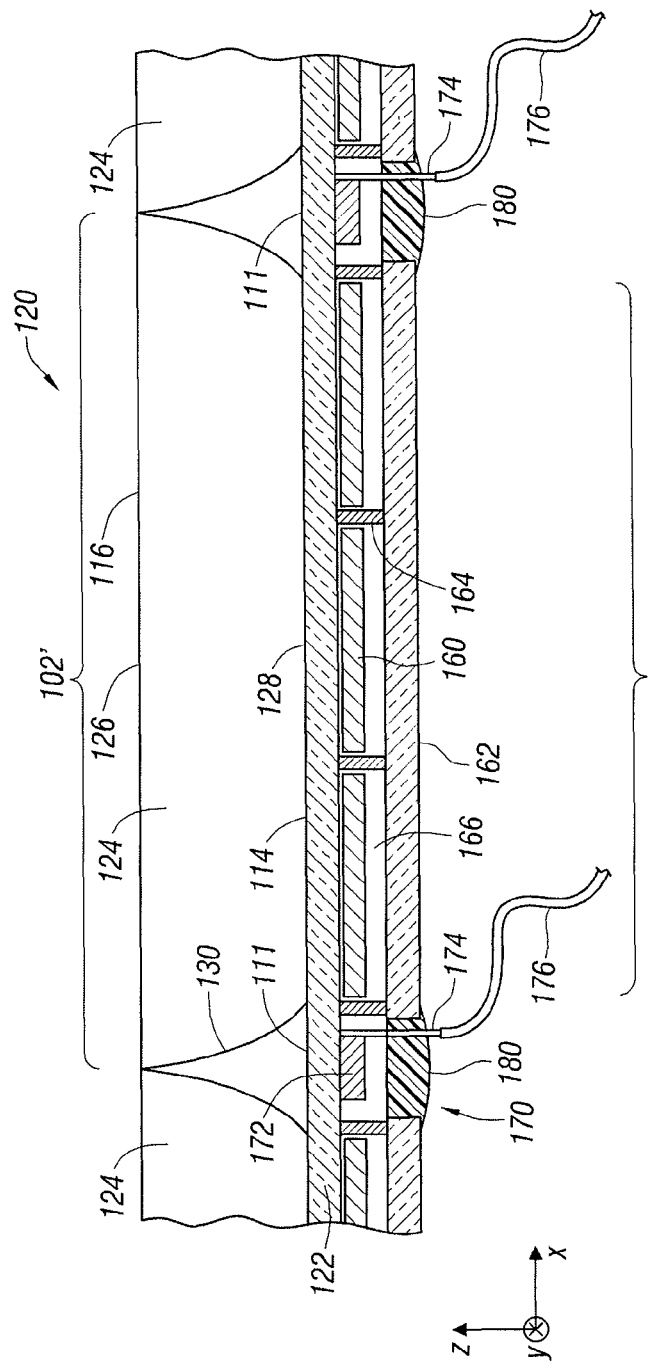
FIG. 12 shows a schematic side section view of embodiments of a display including optical elements arranged to improve perceived image quality.
Figure 13:
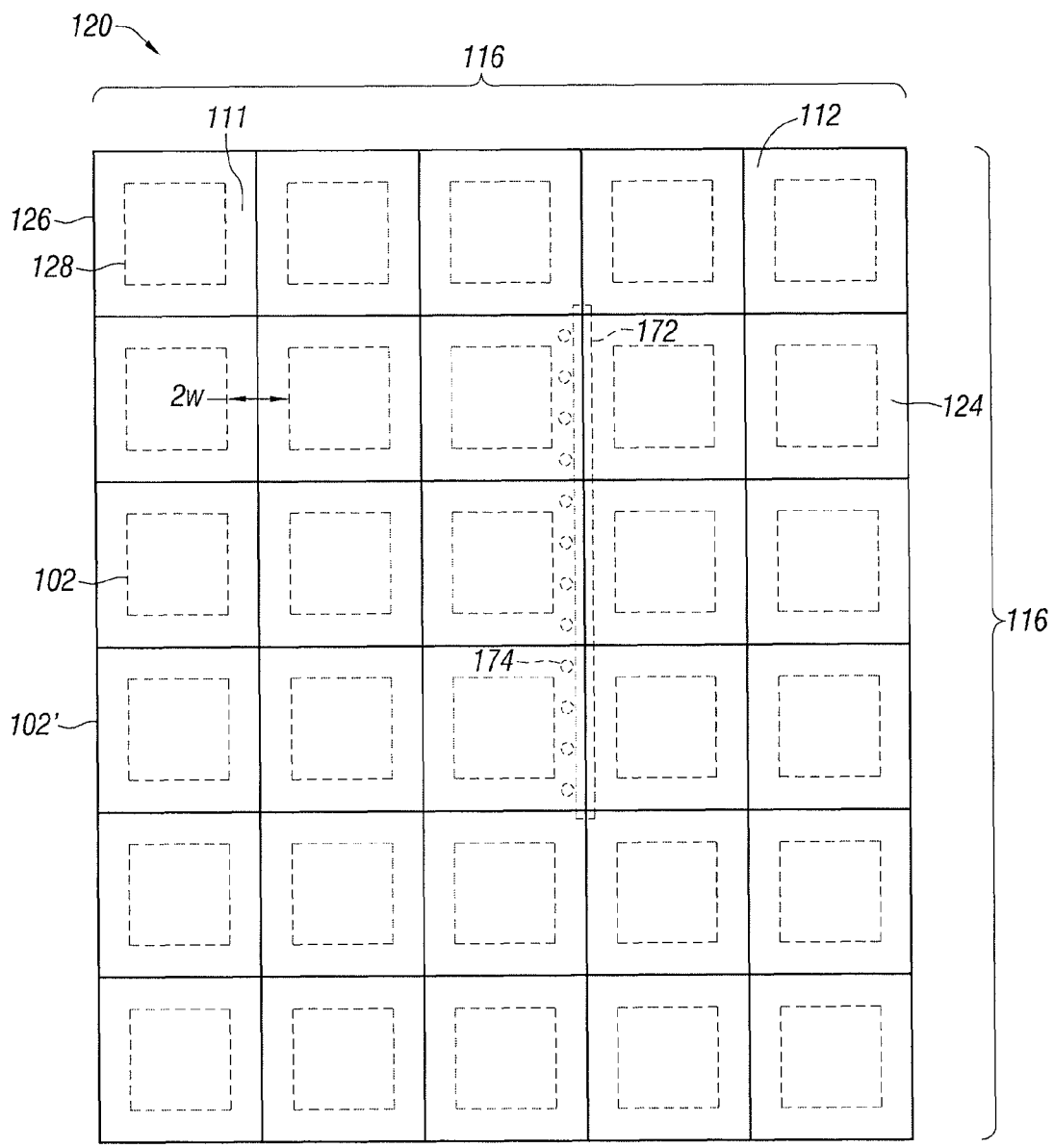
FIG. 13 is a schematic front view an embodiment of a portion of a display including optical elements arranged to improve perceived image quality.

FIG. 12 is a schematic side-section and FIG. 13 is a schematic top or front view illustration of a portion of one embodiment of a display panel 100 of a display 120 that includes a plurality of optical elements 124 disposed forward of respective pixels 102. The reference numeral 120 is shown in FIGS. 12 and 13 to indicate that the structures are part of a larger display 120. As described above, the pixels 102 may comprise color elements 106 (e.g. red, green, and blue color elements 106*a*, 106*b*, 106*c* arranged in groups of sub-pixels 104. The pixels 102 can be separated by nonimage areas 111. Thus, in some embodiments, active areas 114 providing controllable images are noncontinuous, being interrupted or separated by the nonimage areas 111. In various embodiments, the active areas 114 and pixels 102 can be noncontinuous in one or both of vertical and horizontal directions, or generally along x and y axes. As described above, the non-image areas may be regions where display elements have been excluded such as shown in FIG. 12 or may comprise display elements that are consistently undriven, unused or not to be viewed by the intended viewer.

In this embodiment, the display panel 100 comprises a front substrate 122. The front substrate 122 may provide structural support for individual display elements 160 or modulators, for example, during fabrication thereof. In some embodiments, the display elements 160 correspond to individual color elements 106. For example, in some embodiments, the display elements or modulators 160 are formed on the front substrate 122 using deposition and etch processes. Additionally, the front substrate 122 may be configured to provide environmental protection, for example, by inhibiting exposure from moisture, air, dust, and other environmental contaminants to electronic, optical, or other components providing the display capability of the active areas 114. As described above, the substrate 122 may be combined together with other substrates to form modules or brick 110 and larger displays 120. In one example embodiment, the front substrate 122 comprises glass having a thickness of approximately 0.4-0.7 mm. In certain embodiments the front substrate 122 may comprise plastic or other polymer material. Other materials and dimensions of the one or more front substrates 122 are possible.

In this embodiment, the display 120 and display panel 100 also comprises a plurality of optical elements 124 that, in certain embodiments, are attached to a surface of the front substrate 122 arranged towards a viewer of the display 120. In at least certain embodiments, the optical elements 124 are formed of a substantially transparent material, such as one or more of a variety of glass and/or plastic materials. The optical elements 124 are generally adapted to improve the perceived image quality to a viewer/user of the display 120, for example, by reducing or removing the dead space visible to the viewer. The image may appear less pixilated or grainy as a result.

In certain embodiments, the optical elements 124 comprise three-dimensional nonimaging optical elements having a larger input aperture 126 and a smaller output aperture 128. As shown, the input aperture 126 is distal to the substrate 122 and the display elements 160 and the output aperture 128 is proximal to the substrate and the display elements. In certain embodiments the input aperture 126 is designed to match the size and shape of the effective pixel 102'. In some embodiments, the optical elements 124 have an input aperture 126 width approximately 0.1 to 6 millimeters larger than the width of the output aperture 128. In some embodiments, the optical elements 124 have an input aperture 126 area approximately 1.2 to 3 times as large as the area of the output aperture 128. In certain embodiments, the optical elements 124 maintain optical étendue of light passing through the optical elements 124 between the input aperture 126 and the output aperture 128. In one particular embodiment, the optical elements 124 are configured and arranged on the display 120 such that the output apertures 126 are arranged adjacent or proximal and substantially aligned with a corresponding active area 114 of a pixel 102.

In certain embodiments, a single optical element 124 can be optically coupled to one or a plurality of active areas 114 corresponding to a single associated pixel 102. Accordingly, in certain embodiments, an optical element 124 is configured to overlap a plurality of color elements 106. In one embodiment, the width of the output aperture 128 of the optical elements 124 may overlap 1 to many thousands of sub-pixels 104 (e.g. each comprising red, green, and blue color elements). The output aperture 128 of the optical elements 124 may overlap 1 to many thousands of sets of sub-pixels in the orthogonal direction (referred to as the height when viewing the display 120). Accordingly, in certain embodiments, the output aperture 128 may overlap one to many tens of thousands of modulators or display elements 160, which may correspond to a pixel in the image being displayed. In various embodiments, the light propagating from the display elements or modulators 160 is mixed in the optical element 124. As a result, the viewer may see a substantially homogenous output at the input aperture 126 of the optical element 124 even though different color elements 106, possibly of different color, are activated at different locations within the pixel 102.

As shown in FIG. 13, either or both the input and output apertures 126, 128 of the optical elements 124 can be generally square in plan view. The input apertures 126 may butt together such that the viewer does not see much, if any, dead space between pixels 102. The output apertures 128 can overlap the modulators or display elements 160 corresponding to the pixels. As shown in FIG. 13, the output aperture (shown in phantom) is smaller than the input aperture 126. In other embodiments, the input and output apertures 126, 128 may be rectangular, including an elongate height to width ratio, and other shapes.

FIG. 13 shows nonimage space 111 between pixels 102 having a width of approximately 2 W. In certain embodiments, the width 2 W corresponds to the spacing between adjacent active display elements or modulators, e.g., between adjacent active color elements 106 in adjacent pixels 102. In FIG. 13, the distance 2 W between active pixels 102 is exaggerated for illustrative purpose. In certain embodiments, the non-image space 111 between the pixels 102 (shown here having width 2 W) is directly or indirectly determined by the size of the ledge 112 (shown here and in FIG. 8 having width W) surrounding the display panel 100. When display panels 100 are tiled together, adjacent display panels 100 will have active areas separated from each other by 2 W. Optical elements 124 will therefore be used to fill this dead space 111 of 2 W. These optical elements 124 can also be used to fill dead space 111 of equal size, 2W, disposed about the active areas within the display panel 100. The existence of a ledge 112 therefore introduces a dead space 111 that is effectively removed by the optical elements 124.

The optical elements 124 can and will also effectively remove dead space between active areas of adjacent pixels within the display panels 100. The dead space 111 between active areas of adjacent pixels can be used to accommodate components, such as electronics, other than display elements. In some embodiments, therefore, electronics or other components other than display elements can be moved from the ledges 112 to the dead space 111 between active areas of adjacent pixels, which are generally larger than the ledges 112 (e.g., by two times). This rearrangement of components reduces the width of ledges, and by extension the width of dead space 111 which is generally sized to be approximately 2× the ledge width, thus potentially providing a dramatic increase in the percentage active area of the display 120.

As described above, in certain embodiments, the optical elements 124 can operate to mix light such that the light distribution across the effective pixel 102' has substantially the same color and intensity. Also, in at least certain embodiments, the optical elements 124 are configured and arranged with respect to the display 120 such that the larger input apertures 126 are substantially contiguous with adjacent apertures 126 so as to define a substantially uninterrupted effective viewing area 116 across the plurality of pixels 102 in a display panel 100, display module (e.g. brick) 110, and/or display 120. As a result, the array of input apertures 126 form a virtually seamless array of effective image pixels 102' across display panel 100, display module (e.g. brick) 110, and/or display 120.

In one embodiment, the optical elements 124 comprise sidewalls 130 having a generally parabolic profile. In this embodiment, the optical elements 124 comprise compound parabolic collectors (CPCs). The optical elements 124 can comprise generally transparent solid structures, such as can be formed of glass, plastics, and other materials. The optical elements 124 can also comprise generally hollow structures having reflective inner walls or sides, such as can be formed from various metals. As previously noted, the optical elements 124 can define a square, rectangle, or other shape in the plane of the input and output apertures or across planes parallel thereto (e.g., parallel to the x-y plane). These optical elements 124 may therefore be troughs in some embodiments. Also, other contours of the sidewalls 130, for example, generally planar are possible.

In some embodiments, the optical elements 124 operate such that etendue is conserved with light passing through the optical elements 124. In general, in such embodiments, the product of the area of the first aperture $A_1$ times the sine squared of the angle of divergence $\theta_1$ of light passing through the first aperture 126 is equal to the product of the area of the second aperture 128 $A_2$ times the sine squared of the angle of divergence $\theta_2$ of light passing through the second aperture 128. Accordingly, because the input aperture 126 is larger than the output aperture 128, the range of angles of light emitted through the input aperture 126 to the viewer will be reduced in comparison to the range of angles at the output aperture 128. Consequently, in some embodiments, the optical element 124 will reduce the field-of-view of the display 120. Such reduction of view of view may be useful for some applications.

Figure 14:
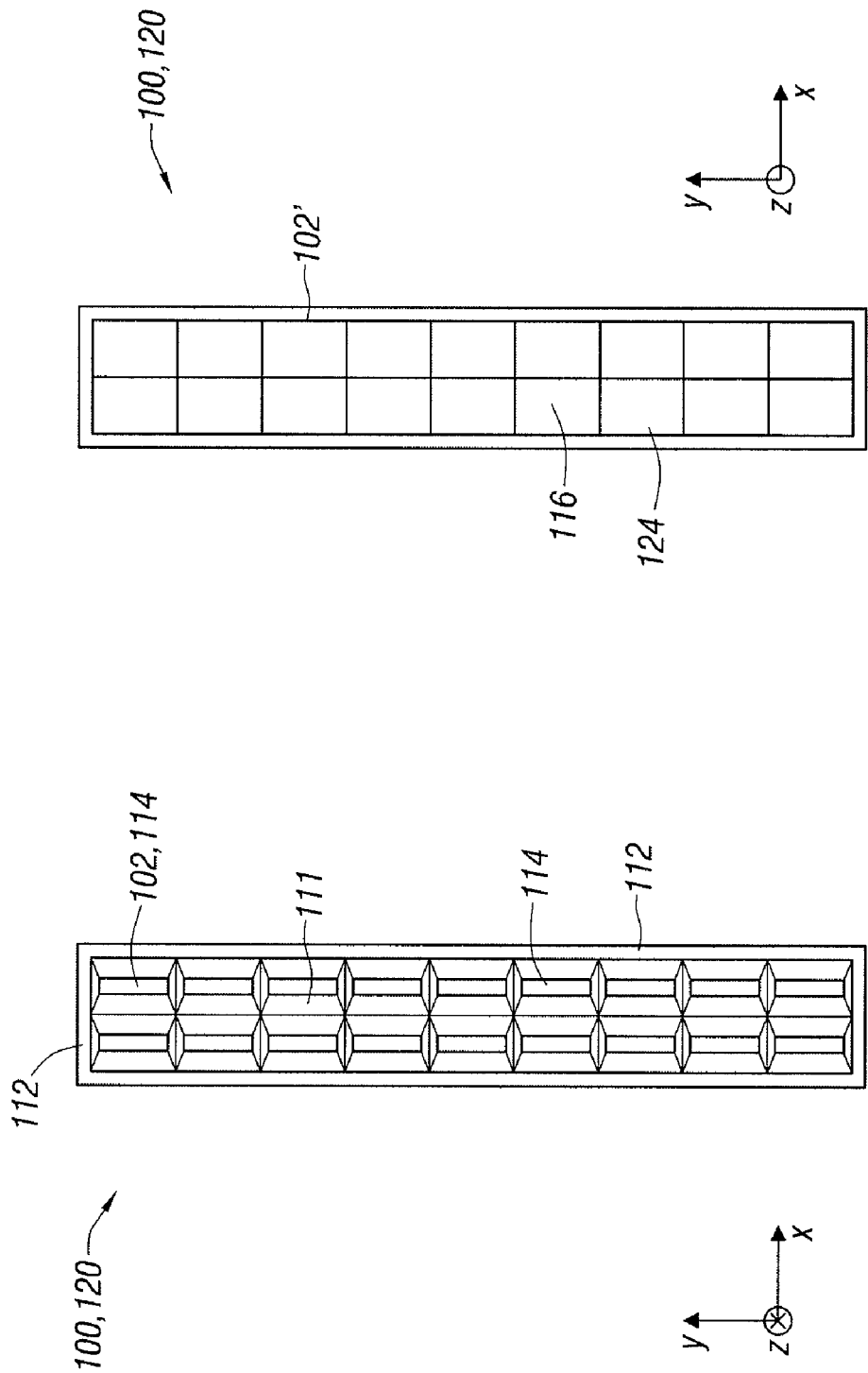
FIG. 14A is a schematic plan view of a portion of a display showing sub-pixels with non-image space between active regions.
FIG. 14B is a schematic plan view of a portion of a display including optical elements arranged to suppress appearance of dead space between the active regions.

As described above, however, the optical element 124 can also reduce the amount of dead space visible to the viewer. This beneficial aspect provided by the optical elements 124 is illustrated in FIGS. 14A and 14B. FIGS. 14A and 14B illustrate a plan view perspective of a portion of a display panel 100 of a display 120. The reference number 100, 120 indicates that the pixels shown are part of a larger display panel 100 and display 120. In this example, active areas 114 each corresponding to a pixel 102 are arranged on a surface with nonimage areas 111 interposed therebetween. In FIG. 14A, the distance between pixels 102 is exaggerated for illustrative purpose. FIG. 14A illustrates a perspective from the pixels 102 looking outward.

FIG. 14B illustrates a plan view from the perspective of a viewer looking towards the display panel 100 and of a portion of an embodiment of display panel 100 of a display 120 comprising a plurality of optical elements 124 disposed forward respective pixels 102. In this embodiment, the outer surface of the optical elements 124 comprises the effective viewing area 116 of the display 120. In this embodiment, the effective viewing area 116 comprises the summed combination of the plurality of larger input apertures 126. In this embodiment, the input apertures 126 are configured such that the effective viewing area 116 is substantially continuous across the display 120. In this embodiment, the input apertures 126 correspond to effective pixels 102'.

Light passes through the optical elements 124 between the smaller apertures 128 proximal to the display element 160 to the larger apertures 126 distal to the display element(s) 160 such that an effective viewing area 116 larger than the corresponding active area 114 is provided and the viewer perceives a larger image for effective viewing. In at least certain embodiments, the optical elements 124 can be configured and arranged on the display 120 such that the effective viewing area 116 presents to the viewer a substantially continuous enlarged view of the corresponding active areas 114 and substantially blocks view of the underlying interposed ledges 112 and/or nonimage areas 111.

Thus, in at least certain embodiments the optical elements 124 can operate to suppress the viewer's perception of the active areas 114 and ledges 112. These aspects not only improve the perceived image quality of a user viewing the display 120 but also reduce limitations in the position and dimensions of the ledges 112 or nonimage areas 111. The optical elements 124 provide increased flexibility in design as the pressure to minimize the widths of the active areas 114 and ledges 112 is reduced. For example, circuit and/or structures that do not themselves generate images can be arranged within nonimage areas 111 and/or ledges 112 while the viewer's view of these components is obscured by the optical elements 124.

Returning to FIGS. 12 and 12A, additional structural features and functions of at least certain embodiments of a display 120 will be described. In certain embodiments, the display 120 comprises display elements 160 illustrated schematically in FIG. 12A. As described above, the display elements 160 generally define the active areas 114 and are included in pixels 102. The display elements or light modulating elements 160 in a pixel 102 are arranged to be substantially aligned with and adjacent the aperture 128 of the optical elements 124 proximal thereto. The display elements 160 are adapted to generate the visible images provided by the display 120. As previously noted, in various embodiments, the display elements 160 can correspond to one or a plurality of sub-pixels, depending on the needs of a particular application. As previously noted, in at least certain embodiments, it is preferred that the display elements 160 comprise MEMS devices, however these are simply one implementation of display technology and a variety of display types can be advantageously employed in various embodiments.

In certain embodiments, the display 120 comprises one or more backplates 162. The backplates 162 may be generally planar structures or otherwise contoured or shaped and may be arranged opposite the front substrates 122 with respect to the display elements 160. In one embodiment, a front substrate 122 is attached to a corresponding backplate 162 via a plurality of supports or spacers 164. In some embodiments, the front substrate 122 and the backplate 162 form one or more substantially sealed cavities 166. The cavities 166 provide a sealed enclosure for one or more corresponding display elements 160. The cavities 166 can also provide a sealed movement envelope for embodiments of the display elements 160 which comprise movable mechanical structures. In other embodiments, the cavities 166 can substantially conform to the exterior contour of the display elements 160. The backplate 166 may inhibit exposure of the display elements 160 to dust, debris, moisture, and other contaminants that might damage or impair the operation of the display elements 160.

Figure 12A:
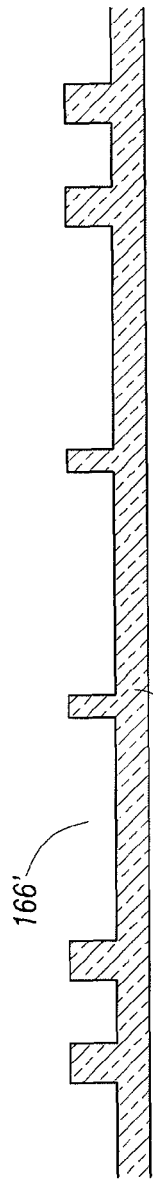
FIG. 12A shows a schematic side section view of embodiments of a backplate on a portion of a display.

FIG. 12A illustrates schematically a further embodiment of a backplate 162' that forms a plurality of separate cavities 166'. In this embodiment, the cavities 166' are provided at least partially as recesses formed in a first surface of the backplate 162'. In certain embodiments, the recesses formed in the backplate 162' can be of such size and configuration that the backplate 162' can be connected to the front substrate 122 such that the cavities 166' are provided substantially by the depth of the recesses formed in the backplate 162'. For example, in at least certain embodiments, the backplate 162' can be attached to the front substrate 122 without the presence of the supports or spacers 164. However, in certain embodiments, the cavities 166' are provided partially via the clearance of recesses formed in the backplate 162' and partially by the distance or spacing provided by interposed supports or spacers 164.

In at least certain embodiments, the display 120 comprises one or more holes 170 formed in the backplate 162. The one or more holes 170 act as vias to enable power and/or control circuits to access the display elements 160 through the backplate 162. Such a design permits circuitry to be located between display elements or modulators 160 or between pixels 102 instead of being at the periphery of the display panel or substrate. The ledge 112 at the periphery of the display panel 100 or substrate can thereby be reduced because less room is needed at the periphery for circuitry. The pixels 102 in a first display panel 100 can be made closer to the pixels 102 in a second display panel 100 adjacent thereto because dead space between the peripheries of the display panels 100 can be reduced. In some embodiments, dead space between the pixels 102 on the first display panel 100 and the pixels 102 in the second display panel 100 can have substantially the same width, 2W, as the width, 2W, between adjacent pixels 100 (or possibly adjacent modulators 160) on either display panel.

In certain embodiments, driver integrated circuits (IC) 172 are arranged in proximity to a corresponding hole 170 and secured to a region of the front substrate 122 and/or rear substrate 162 or elsewhere. The driver ICs 172 may be adapted to provide operating control power to respective display elements 160 and/or to decode and route control and data signals to be provided to the respective display elements 160 to achieve the desired image outputs therefrom.

In certain embodiments, the driver ICs 172 are connected to a plurality of connector pins 174 that can extend partially or completely through the corresponding holes 170. The connector pins 174 are configured for attachment to a corresponding set of conductors 176. The conductors 176 would generally be connected at an opposite end to control electronics which provide the image data for display by the display 120.

In certain embodiments, a seal 180 is formed in the hole 170. The seal 180 can comprise adhesives, low temperature welds, or other methods/processes of sealing an opening. The seal 180 acts in cooperation with the front and backplates 122, 162 to inhibit exposure of the driver ICs 172 to possible contamination or damage from dust, debris, moisture, and the like. In certain embodiments, the seal 180 also contributes to electrical isolation between a plurality of connector pins 174 connected to the respective driver ICs 172.

FIG. 13 shows in phantom the driver ICs or other chip or circuitry 172 and the pins 174 electrically connected thereto on a display panel 100. In this example shown in FIG. 13, the driver ICs 172 and pins 174 are shown in nonimage areas 111 between pixels 102 and between the apertures 128 of the optical elements 124 proximal to the display elements 160. However it will be understood that this is simply one non-limiting example and a wide variety of placement locations for circuit components are possible. A wide variety of variations and configurations are possible. Holes may therefore be included in the backplate 162 to provide electrical connection to the display elements 160 or to circuitry electrically connected to the display elements.

Figure 15:
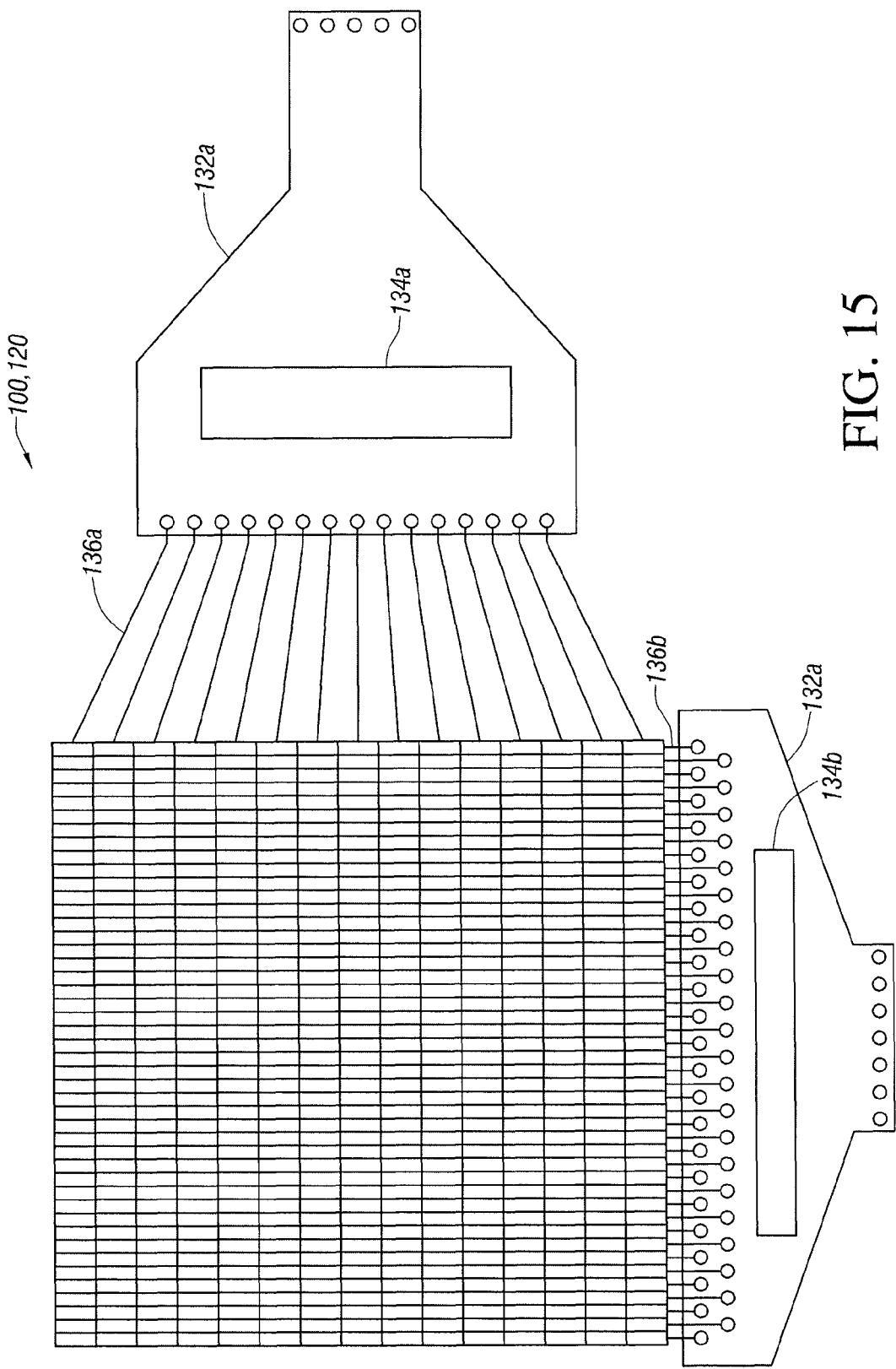
FIG. 15 is a schematic illustration of one embodiment of arranging power, control, and data circuits for a display.

FIG. 15 is a schematic illustration of certain embodiments of providing power, data, and control signals to individual display elements of the display 120. Reference numerals 100 and 120 indicate that the components shown are incorporated together with one or more display panels 100 in a larger display 120. In this embodiment, the display 120 included row flex assemblies 132a and column flex assemblies 132b. In this embodiment, the flex assemblies 132a, 132b can be configured to receive a plurality of power, control, and/or data signals for video images to be displayed on the display 120 from a control processor. The flex assemblies 132a, 132b may also be configured to convey power, data, and control signals to a plurality of conductors 136a and 136b configured to convey these power, data, and control signals along rows and columns respectively to display elements of the display 120.

In this embodiment, interface circuitry 134a, 134b are provided to convert incoming power, data, and control signals received by the flex assembly 132 for transmission via the corresponding plurality of conductors 136 to the individual display elements of the display 120. In at least certain embodiments, the interface circuitry 134a, 134b is located or arranged on a respective flex assembly 132a, 132b. The interface circuitry 134a, 134b may comprise application specific integrated circuits (ASICs) adapted to convert a relatively smaller number of incoming power, data, and control signals to a relatively larger number of corresponding data and control signals to be conveyed to individual elements.

In some embodiments, the interface circuitry 134a, 134b is not on the display panel 100. For example, the substrate does not include on-board addressing circuits. Instead, certain embodiments have interface circuitry 134a, 134b arranged on corresponding flex assemblies 132a, 132b. Some embodiments provide relatively simpler construction of individual display panels 100 as the driver circuits of the display elements 160 are at least partially spatially displaced away from the display elements 160 themselves defining the respective active areas 114. Other variations are possible. Constructing display 120 using this method leads to significant complexity of integration, since ledge widths are enlarged by the attachments for the flex circuits, and the flex circuits themselves must be folded behind the display panels. Such attachment and folding can also lead to significant yield loss.

Figure 16:
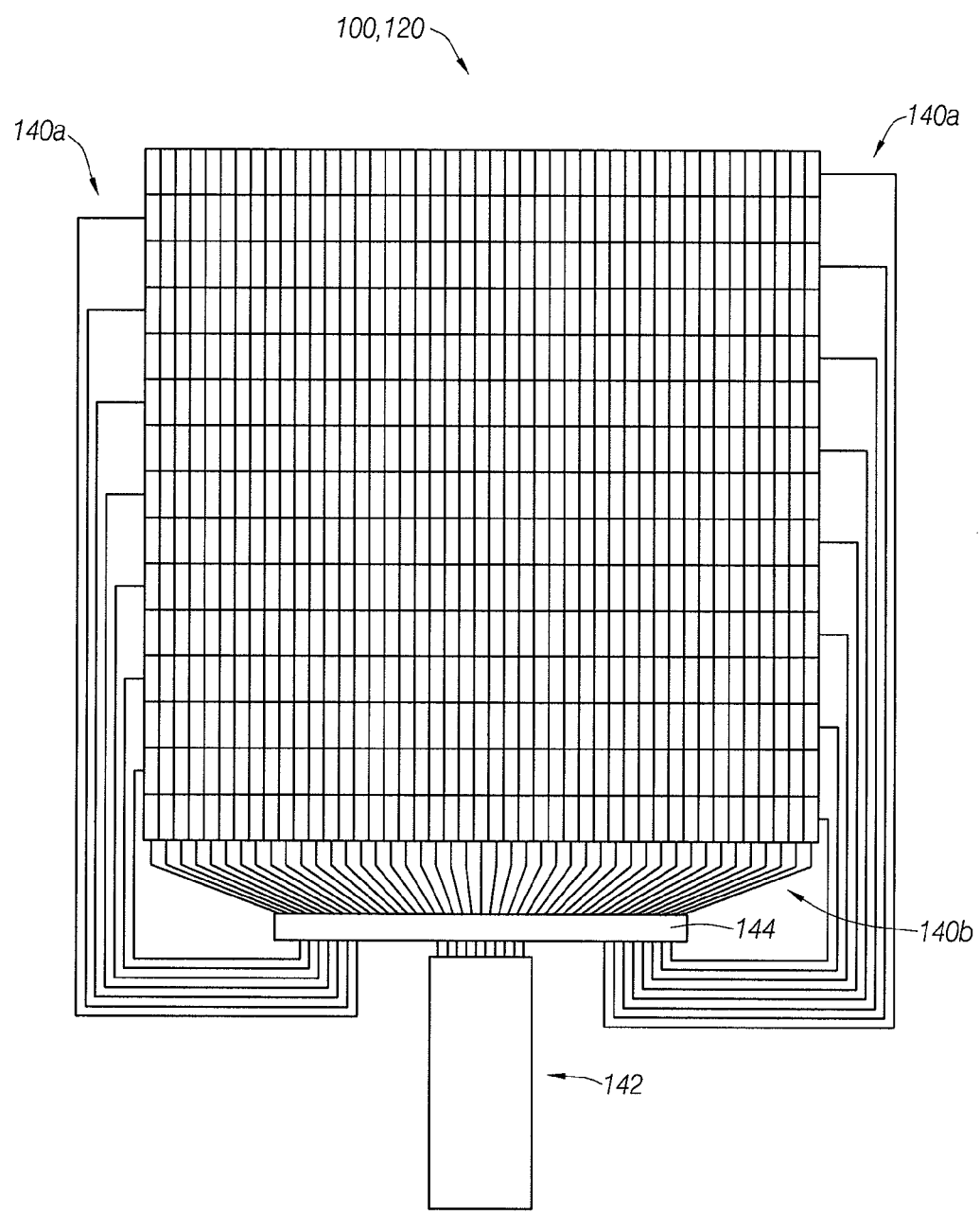
FIG. 16 is a schematic illustration of another embodiment of arranging power, control, and data circuits for a display.

FIG. 16 schematically illustrates a further embodiment of electrical connection for display panels 100 of a display 120. In this embodiment, a plurality of row conductors 140a and column conductors 140b can be in communication at a first end with power sources and/or one or more control processors 144 to provide power, data, and/or control signals to the display 120. In one embodiment, row conductors 140a are attached at a first side to odd numbered rows and are attached at an opposite second side to even numbered rows. The control processor receives the power, data, and control signal through a flex assembly 142. Relative to the embodiment of FIG. 15, the display panel of this embodiment is more complex, since the control processor 144 is mounted directly to the display panel itself and the routing of the on-panel leads is convoluted. The flex assembly 142 becomes less complex since it contains no active circuitry. However, the need to make attachment at the edge where two panels 100 meet still provides system integration complexity and potential yield loss mechanisms.

Figure 17:
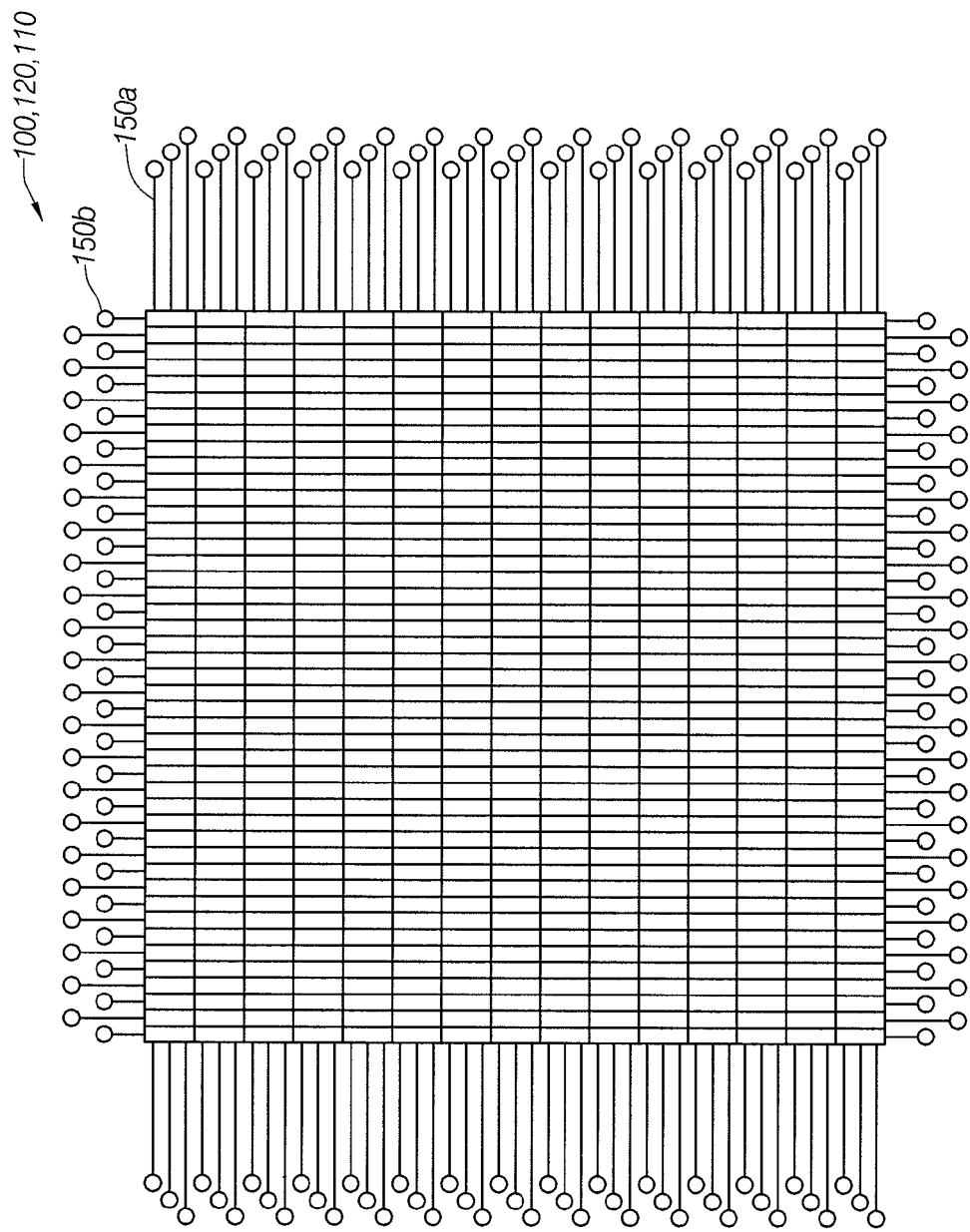
FIG. 17 is a schematic illustration of one embodiment of arranging power, control, and data circuits for a display.

FIG. 17 schematically illustrates a further embodiment of electrical connection for display panels 100 of a display 120. In this embodiment, a plurality of row conductors 150a extend across a plurality of panels 100 and stitch or electrically connect the plurality of panels 100 together. In some embodiments, the stitching or interconnection of the conductors 150a extends across one or more bricks 110 of the display 120. A plurality of column conductors 150b similarly extends across a plurality of panels 100. In some embodiments, the stitching or interconnection of the conductors 150b extends across one or more bricks 110 of the display 120. In some embodiments, addressing/drive circuits 144 can be arranged on a substrate, such as the front substrates 122 and/or backplates 162 and can be connected to the corresponding row and column conductors 150a, 150b by interconnecting holes or vias 170. In some embodiments, at least a portion of addressing/drive/power circuitry is arranged generally about a periphery of the display assembly 120. As the physical distance from a periphery of the display assembly 120 to central regions of the display assembly 120 can be significant, addressing/drive/power circuitry may need to deliver more power than otherwise. This approach can dramatically reduces the complexity of routing on the display panel itself and lessen the complexity of system integration, but passing signals across multiple panels provides a potential yield loss and represents a method not commonly used in display manufacturing.

Various embodiments of the display 120 facilitate a variety of addressing modes. While any of a variety of addressing modes is possible with the various embodiments, in general certain addressing modes may be more preferred in at least certain applications than other addressing modes. For example, embodiments such as illustrated generally by FIG. 15 having relatively simpler bricks 110 and interface circuitry 134a, 134b arranged on flex assemblies 132a, 132b can readily accommodate area modulation and temporal modulation. Line by line area modulation can be implemented with peripheral drivers attached to or otherwise communicating with the display 120. Certain embodiments corresponding generally to those illustrated by FIG. 15 may exhibit relatively greater capacitance of the bricks 110 and addressing modes implementing temporal modulation may need to accommodate the relatively higher capacitance.

Embodiments corresponding generally to those illustrated by FIG. 16 comprise relatively more complex bricks 110 that may have the addressing/drive circuits arranged on the substrate or board 108. In a similar manner to the embodiments corresponding to those illustrated by FIG. 15, these embodiments can also accommodate area and temporal modulation. In at least certain implementations, power consumption is reduced by using area modulation.

The embodiments corresponding generally to those illustrated by FIG. 17 can be considered as comprising relatively simpler panels 100, however, having more complex interconnection of the various display elements. In at least certain implementations, the relatively low lead count of these embodiments would make spatial modulation less preferred. Temporal modulation would thus be more preferred, however, in at least certain implementations may require higher power drivers.

Overall, the various embodiments disclosed herein offer many advantages. Moving control processor electronics from ledges at the edges of the display panels to optically hidden areas centrally located on the display panels eliminates almost all of the panel-edge-mating difficulties of other approaches. Bringing electrical connections to the panels away from their edges makes attachment to the display panels much easier. Designing panels with identical, regularly space non-image areas allows non-imaging optical elements to provide effective color mixing and a nearly seamless appearance. Providing a method that uses existing high volume manufacturing methods enables a relatively inexpensive, intermediate-sized display that can be relatively inexpensively produced and marketed and has relatively low power consumption characteristics.

Certain embodiments provide an intermediate-sized display which avoids the clear projection path limitations (e.g., large distance between projector and screen) of projection-type displays and offers the installation convenience and flexibility of low profile or "flat panel" type displays. Such an improved display design can facilitate utilization of the display in a variety of implementations that are not currently technically or economically feasible. For example, an intermediate-size, low-profile, low-cost display could be widely used for advertisement purposes in a variety of indoor and outdoor locations. Advertisements could be frequently updated. Such a display could also be utilized in a wide variety of locations where existing single full video capable display assemblies or panels (such as a single CRT, LCD, or plasma display) are too small and where the economics do not justify use of the larger Jumbotron or arrayed LED approach. Other applications are also possible.

Although the above disclosed embodiments of the present teachings have shown, described and pointed out the fundamental novel features of the invention as applied to the above-disclosed embodiments, it should be understood that various omissions, substitutions, and changes in the form of the detail of the devices, systems and/or methods illustrated may be made by those skilled in the art without departing from the scope of the present teachings. Components, devices, and features and may be added, removed, or rearranged in different embodiments. Similarly processing steps be added, removed, or reordered in different embodiments. Accordingly, the scope of the invention should not be limited to the foregoing description but should be defined by the appended claims.

What is claimed is:

1. A display apparatus defining an active viewing area visible to a viewer, said apparatus comprising:
 a plurality of reflective spatial light modulator arrays, each of said reflective spatial light modulator arrays comprising a plurality of light modulating elements disposed on a substrate, said plurality of reflective spatial light modulator arrays arranged in a larger array; and
 a plurality of optical elements each having an input aperture and an output aperture, said input aperture being larger than said output aperture, said input aperture disposed distal to said light modulating elements and said output aperture disposed proximal to said light modulating elements such that light received by said input apertures propagates though said optical elements and exits said output apertures to said light modulating elements;
 wherein the output aperture of an optical element overlaps a plurality of light modulating elements.

2. The display apparatus of claim 1, wherein said light modulating elements comprise MEMS.

3. The display apparatus of claim 1, wherein said light modulating elements comprise first and second reflective surfaces, one of which is movable with respect to the other.

4. The display apparatus of claim 1, wherein said light modulating elements comprise interferometric modulators.

5. The display apparatus of claim 1, wherein the optical elements comprise non-imaging elements.

6. The display apparatus of claim 5, wherein the optical elements comprise compound parabolic collectors.

7. The display apparatus of claim 1, wherein said input aperture has an area that is between about 1.2 to 3 times as large as said output area.

8. The display apparatus of claim 1, further comprising inactive areas between said light modulating elements, said inactive areas having a width as measured from the edges of active areas of adjacent light modulating elements.

9. The display apparatus of claim 8, wherein said input and output apertures have widths and said input aperture is larger than said output aperture by about said width of one of said inactive areas between adjacent light modulating elements.

10. The display apparatus of claim 8, wherein said width of said inactive areas between adjacent light modulating elements is between 0.5 to 3 millimeters.

11. The display apparatus of claim 9, wherein said input aperture is larger than said output aperture by between about 0.1 to 6 millimeters.

12. The display apparatus of claim 1, wherein the output aperture is disposed within about 0.5 millimeters from said light modulating element.

13. The display apparatus of claim 1, wherein said optical element is attached to said substrate on which said light modulating elements are formed.

14. The display apparatus of claim 1, wherein a spatial light modulator array comprises a plurality of pixels that comprise a plurality of sub-pixels, and wherein the output aperture of an optical element overlaps a plurality of sub-pixels.

15. The display apparatus of claim 14, wherein the output aperture of an optical element overlaps at least 5 sub-pixels.

16. The display apparatus of claim 1, wherein said spatial light modulator array is between about 1 and 5 inches wide.

17. The display apparatus of claim 1, wherein said plurality of spatial light modulator arrays is between about 4 and 12 inches wide.

18. The display apparatus of claim 1, wherein said larger array is between about 2 and 10 meters wide.

19. A display apparatus comprising:
 a plurality of reflective light modulating elements arranged in an array; and
 a plurality of optical elements having an input aperture and an output aperture, said input aperture being larger than said output aperture, said input aperture disposed distal to said light modulating elements and said output aperture disposed proximal to said light modulating elements such that light received by said input apertures propagates through said optical elements and exits said output apertures to illuminate said light modulating elements;
 wherein the output aperture of an optical element overlaps a plurality of the light modulating elements.

20. The display apparatus of claim 19, wherein said light modulating elements comprise MEMS.

21. The display apparatus of claim 19, wherein said light modulating elements comprise first and second reflective surfaces, one of which is movable with respect to the other.

22. The display apparatus of claim 19, wherein said light modulating elements comprise interferometric modulators.

23. The display apparatus of claim 19, wherein the optical elements comprise non-imaging elements.

24. The display apparatus of claim 23, wherein the optical elements comprise compound parabolic collectors.

25. The display apparatus of claim 19, further comprising inactive areas between said light modulating elements, said inactive areas having a width as measured from the edges of active areas of adjacent light modulating elements.

26. The display apparatus of claim 25, wherein said input and output apertures have widths and said input aperture is larger than said output aperture by about said width of one of said inactive areas between adjacent light modulating elements.

27. The display apparatus of claim 25, wherein said width of said inactive areas between adjacent light modulating elements is between 0.5 to 3 millimeters.

28. The display apparatus of claim 26, wherein said input aperture is larger than said output aperture by between about 0.1 to 6 millimeters.

29. The display apparatus of claim 19, wherein the output aperture is disposed within about 0.5 millimeters from said light modulating element.

30. The display apparatus of claim 19, wherein said optical element is attached to said substrate on which said light modulating elements are formed.

31. A display apparatus defining an active viewing area visible to a viewer, said apparatus comprising:
 a plurality of reflective spatial light modulator arrays, each of said reflective spatial light modulator arrays comprising a plurality of light modulating elements disposed on a substrate, said plurality of reflective spatial light modulator arrays arranged in a larger array; and
 a plurality of optical elements each having an input aperture and an output aperture, said input aperture being larger than said output aperture, said input aperture disposed distal to said light modulating elements and said output aperture disposed proximal to said light modulating elements such that light received by said input apertures propagates though said optical elements and exits said output apertures to said light modulating elements;

wherein each spatial light modulator array comprises a plurality of pixels each comprising a plurality of sub-pixels, and wherein the output aperture of an optical element overlaps the sub-pixels in the pixel.

32. The display apparatus of claim 31, wherein said light modulating elements comprise MEMS.

33. The display apparatus of claim 31, wherein said light modulating elements comprise first and second reflective surfaces, one of which is movable with respect to the other.

34. The display apparatus of claim 31, wherein said light modulating elements comprise interferometric modulators.

35. The display apparatus of claim 31, wherein the optical elements comprise non-imaging elements.

36. The display apparatus of claim 35, wherein the optical elements comprise compound parabolic collectors.

37. The display apparatus of claim 31, wherein said input aperture has an area that is between about 1.2 to 3 times as large as said output area.

38. The display apparatus of claim 31, further comprising inactive areas between said light modulating elements, said inactive areas having a width as measured from the edges of active areas of adjacent light modulating elements.

39. The display apparatus of claim 38, wherein said input and output apertures have widths and said input aperture is larger than said output aperture by about said width of one of said inactive areas between adjacent light modulating elements.

40. The display apparatus of claim 38, wherein said width of said inactive areas between adjacent light modulating elements is between 0.5 to 3 millimeters.

41. The display apparatus of claim 39, wherein said input aperture is larger than said output aperture by between about 0.1 to 6 millimeters.

42. The display apparatus of claim 31, wherein the output aperture is disposed within about 0.5 millimeters from said light modulating element.

43. The display apparatus of claim 31, wherein said optical element is attached to said substrate on which said light modulating elements are formed.

44. The display apparatus of claim 31, wherein said spatial light modulator array is between about 1 and 5 inches wide.

45. The display apparatus of claim 31, wherein said plurality of spatial light modulator arrays is between about 4 and 12 inches wide.

46. The display apparatus of claim 31, wherein said larger array is between about 2 and 10 meters wide.

* * * * *

UNITED STATES PATENT AND TRADEMARK OFFICE
CERTIFICATE OF CORRECTION

PATENT NO. : 7,948,672 B2  
APPLICATION NO. : 12/107669  
DATED : May 24, 2011  
INVENTOR(S) : Jeffrey B. Sampsell Page 1 of 1

It is certified that error appears in the above-identified patent and that said Letters Patent is hereby corrected as shown below:

Title Page 2, Column 2, Line 37, Item 56 (Other Publications), "dated Oct. Nov. 6, 2007." should be changed to --dated November 6, 2007.--

Column 11, Line 44, "shown in FIG. 1." should be changed to --shown in FIG. 11.--

Signed and Sealed this

Twenty-second Day of November, 2011

David J. Kappos  
*Director of the United States Patent and Trademark Office*